(12) United States Patent
Kitaura et al.

(10) Patent No.: US 8,194,912 B2
(45) Date of Patent: Jun. 5, 2012

(54) METHOD AND APPARATUS FOR ANALYZING IMAGE, AND COMPUTER PRODUCT

(75) Inventors: Asako Kitaura, Kawasaki (JP); Seiya Shimizu, Kawasaki (JP); Masami Mizutani, Kawasaki (JP); Eishi Morimatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 909 days.

(21) Appl. No.: 11/499,655

(22) Filed: Aug. 7, 2006

(65) Prior Publication Data

US 2007/0122058 A1    May 31, 2007

(30) Foreign Application Priority Data

Nov. 28, 2005   (JP) ................................. 2005-342622

(51) Int. Cl.
*G06K 9/00* (2006.01)
(52) U.S. Cl. ........................ 382/100; 382/106
(58) Field of Classification Search .................. 382/100, 382/106
See application file for complete search history.

(56) References Cited

U.S. PATENT DOCUMENTS

| | | | | |
|---|---|---|---|---|
| 5,598,488 A * | 1/1997 | Poggio et al. | ................. | 382/278 |
| 6,031,941 A * | 2/2000 | Yano et al. | ................. | 382/276 |
| 7,113,185 B2 * | 9/2006 | Jojic et al. | ..................... | 345/420 |
| 7,313,285 B2 * | 12/2007 | Aliaga et al. | ................. | 382/243 |
| 2002/0163596 A1 * | 11/2002 | Griessl et al. | ................. | 348/701 |

FOREIGN PATENT DOCUMENTS

| | | |
|---|---|---|
| JP | 4-148282 A | 5/1992 |
| JP | 10-093954 A | 4/1998 |
| JP | 11-164325 A | 6/1999 |
| JP | 11-164325 A | 6/1999 |
| JP | 2001-143072 A | 5/2001 |
| JP | 3230998 | 9/2001 |
| JP | 3230998 | 9/2004 |
| JP | 2005-056295 A | 3/2005 |
| WO | WO 2005/038402 A1 | 4/2005 |

OTHER PUBLICATIONS

Japan Patent Office: Japanese Office Action mailed Oct. 26, 2010 in JP Patent Application No. 2005-342622, with partial English-language translation.
Japanese Notice of Reasons for Rejection, Partial English-language translation, mailed Jan. 25, 2011 for corresponding Japanese Application No. 2005-342622.

* cited by examiner

*Primary Examiner* — Hadi Akhavannik
(74) *Attorney, Agent, or Firm* — Fujitsu Patent Center

(57) ABSTRACT

In analysis of a panorama image that is created by processing a series of picture frames, a partial image to constitute a part of the panorama image is extracted from one picture frame among the picture frames, optical flows of the one picture frame is calculated, each of the optical flows with each pixel in the partial image are associated with each other, and a distance to a subject appearing in the partial image is calculated based on the associated optical flows.

11 Claims, 24 Drawing Sheets

MARKER INDICATING CURRENT POSITION (A)  (B)  (C)

CUTOUT RANGE — BASIC OPTICAL FLOW

DIRECTION OF TIME

SUBJECT RROJECTED IN PRIORITY IN CONVENTIONAL METHOD

METHOD AND APPARATUS FOR ANALYZING IMAGE, AND COMPUTER PRODUCT

CROSS-REFERENCE TO RELATED APPLICATIONS

This application is based upon and claims the benefit of priority from the prior Japanese Patent Application No. 2005-342622, filed on Nov. 28, 2005, the entire contents of which are incorporated herein by reference.

BACKGROUND OF THE INVENTION

1. Field of the Invention

The present invention relates to a technology for analyzing a panorama image.

2. Description of the Related Art

For map maintenance to keep map data updated, roadside information, such as a change in store information, is commonly collected by taking roadside pictures on the scene to be examined later, instead of walking around the scene for field survey.

Such roadside pictures are, however, usually data (moving picture) of long hours. Therefore, to check the pictures to analyze the information, it requires a great deal of labor. With such reason, another method of creating a roadside panorama image (still image) to be used in the analysis has been employed.

A roadside panorama image is created by projecting picture frames including two-dimensional images accumulated in the direction of the time axis onto a single two-dimensional image without the time axis. With such panorama image, it is possible to easily and intuitively understand the overall situation of a roadside. Therefore, a load of checking the pictures to collect the information can be reduced.

Moreover, the roadside pictures taken while moving on a road include, for example, images of the same roadside part if an image-capturing device stops at a traffic light. In contrast, the roadside panorama image created along the horizontal axis of travel distance instead of the time axis reduces the repeatedly captured same roadside part images into the same image to prevent the same subject from appearing in the panorama image multiple times. The roadside panorama image, therefore, reduces the volume of data remarkably, compared to the roadside pictures.

A method of creating a roadside panorama image is disclosed in, for example, Japanese Patent No. 3230998. This method is employed principally for detecting a perking vehicle or inspecting the interior of a tunnel. According to the method, slits are taken using a line sensor mounted on a vehicle, while measuring the travel distance or travel speed of a mobile object precisely to adjust timing of shooting, and the slits are connected laterally to form a roadside panorama image.

Another method is disclosed in for example, Japanese patent Laid-Open Publication No. H11-164325. In this method, pictures taken by a video camera mounted on a vehicle is used to create the panorama image. Parts of each picture frame (slit image) are cut out and connected to form a panorama image. According to this method, each optical flow on the vertical centerline of an image in each picture frame is calculated, and a width (referred to as basic flow) based on each optical flow is determined. According to the determined width, the vicinity to the centerline of the image is cut out in a shape of a vertically elongated strip as a slit image. In this manner, the slit image is cut out from each picture image, and each slit image is connected to adjacent one in order.

A part containing optical flows smaller than the cutout width, i.e., the basic flow, may be stretched properly upon cutting out. A panorama image created by the above methods is easier in checking than the moving picture, however, sometimes becomes a laterally elongated image that contains tens of thousands of pixels sideways.

In analyzing a roadside, although reduction of trouble in checking images has been tried by a use of the roadside panorama image as the conventional techniques described above, the roadside panorama image is required to be checked. Therefore, a load on the worker engaged in the map maintenance work has still been heavy.

Besides, a change in the roadside situation is detected by checking both the previous roadside panorama image and the present roadside panorama image by the worker. Thus, detection of the change is dependent on the worker, and the map maintenance work cannot be efficiently done.

SUMMARY OF THE INVENTION

It is an object of the present invention to at least solve the above problems in the conventional technologies.

A computer-readable recording medium according to one aspect of the present invention stores therein a computer program for analyzing a panorama image that is created by processing a series of picture frames. The computer program makes a computer execute extracting a partial image to constitute a part of the panorama image, from one picture frame among the picture frames; calculating optical flows of the one picture frame; associating each of the optical flows with each pixel in the partial image; and calculating a distance to a subject appearing in the partial image based on the associated optical flows.

An apparatus according to another aspect of the present invention is for analyzing a panorama image that is created by processing a series of picture frames. The apparatus includes an extracting unit configured to extract a partial image to constitute a part of the panorama image, from one picture frame among the picture frames; an optical-flow calculating unit configured to calculate optical flows of the one picture frame; an associating unit configured to associate each of the optical flows with each pixel in the partial image; and a distance calculating unit configured to calculate a distance to a subject appearing in the partial image based on the associated optical flows.

A method according to still another aspect of the present invention is of analyzing a panorama image that is created by processing a series of picture frames. The method includes extracting a partial image to constitute a part of the panorama image, from one picture frame among the picture frames; calculating optical flows of the one picture frame; associating each of the optical flows with each pixel in the partial image; and calculating a distance to a subject appearing in the partial image based on the associated optical flows.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of the present invention will be explained in detail below with reference to the accompanying drawings.

Figure 1:
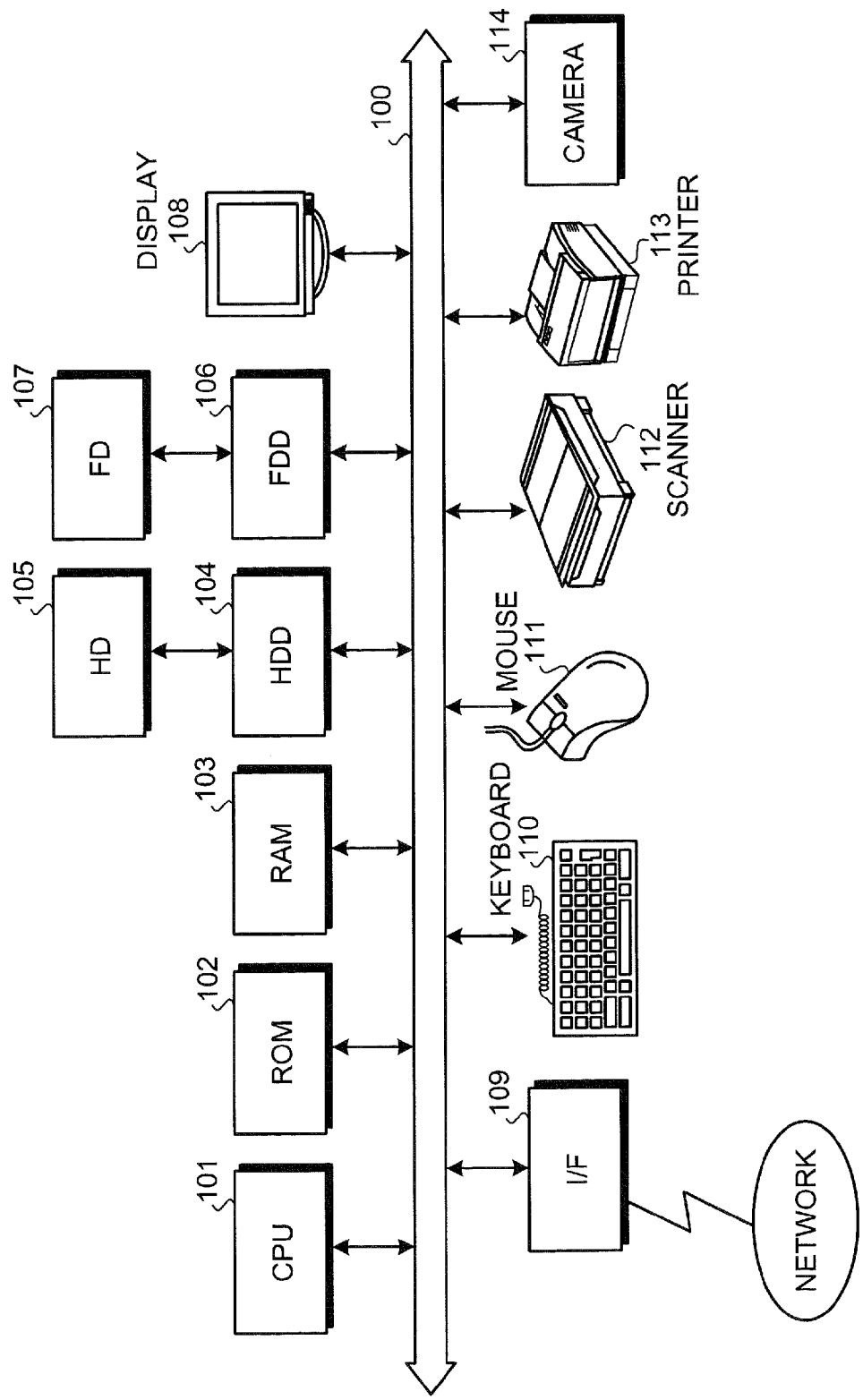
FIG. 1 is a schematic of a hardware configuration of an image analyzing apparatus according to an embodiment of the present invention.

FIG. 1 is a schematic of a hardware configuration of an image analyzing apparatus according to an embodiment of the present invention. As shown in FIG. 1, the image analyzing apparatus includes a central processing unit (CPU) 101, a read-only memory (ROM) 102, a random access memory (RAM) 103, a had disk drive (HDD) 104, an hard disk (HD) 105, a flexible disk drive (FDD) 106, a flexible disk (FD) 107 as an example of a an removable recording medium, a display 108, an interface (I/F) 109, a keyboard 110, a mouse 111, a scanner 112, a printer 113, and a camera 114. Each component is interconnected via a bus 100.

The CPU 101 controls the entire image analyzing apparatus. The ROM 102 stores a program, such as a boot program. The Rom 103 is used as a work area of the CPU 101. The HDD 104, operating under control by the CPU 101, controls data reading/writing on the HDD 105. The HDD 105 stores data written therein under control by the HDD 104.

The FDD 106, operating under control by the CPU 101, controls data reading/writing on the FD 107. The FD 107 stores data written therein under control by the FDD 106, and allows the image analyzing apparatus to read the data stored in the FD 107.

Besides the FD 107, the removable recording medium may be a compact-disc read-only memory (CD-ROM), a compact-disc recordable (CD-R), a compact-disc rewritable (CD-RW), a magneto optical (MO) disk, a digital versatile disk (DVD), a memory card, etc. The display 108 displays a cursor, icons, a tool box, document data, image data, functional information, etc. For example, a cathode ray tube (CRT), a thin film transistor (TFT) liquid crystal display, or a plasma display can be employed as the display 108.

The I/F 109 is connected to a network, such as the Internet, via a communication line, and to other devices via the network. The I/F 109 controls the network and the internal interface so as to control data input/output to/from an external device. For example, a modem or a local area network (LAN) adaptor can be employed as the I/F 109.

The keyboard 110 has keys for use in entering characters, figures, various instructions, etc. in data input. The keyboard 110 may be in a form of a touch panel input pad, a numeric keypad, etc. The mouse 111 is used to move the cursor, select a range, change a position and a size of a window, and to execute other operations. The mouse 111 can be replaced with a track ball or a joy stick that has similar functions as a pointing device.

The scanner 112 optically reads an image to capture image data into the image analyzing apparatus. The scanner 112 may be provided with an optical character recognition (OCR) function. The printer 113 may be a laser printer or an ink jet printer.

The camera 114 captures the image of a subject to produce a series of picture frames to be taken into the image analyzing apparatus. When the camera 114 is mounted on a mobile object, such as a vehicle, the camera 114 can capture the image of a roadside as a subject. While "roadside" generally means the side of a road, in the embodiments described herein gives "roadside" a connotation that also means buildings and the ground at the roadside, and other ground objects separated from the building and the ground within a view from the camera 114. The camera 114 may be a video camera or line sensor camera.

Figure 2:
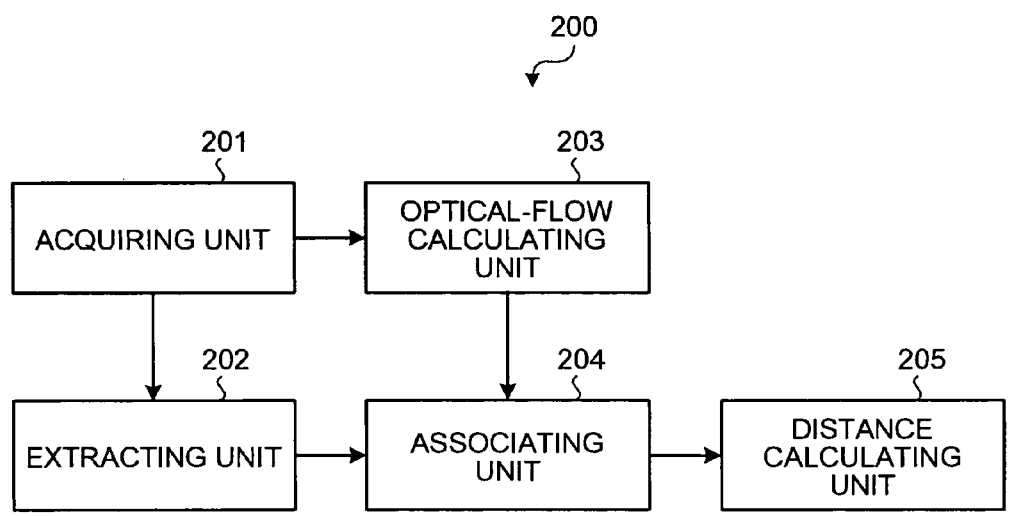
FIG. 2 is a block diagram of a functional configuration of the image analyzing apparatus.

FIG. 2 is a block diagram of a functional configuration of the image analyzing apparatus. As shown in FIG. 2, an image analyzing apparatus 200 includes an acquiring unit 201, an extracting unit 202, an optical-flow calculating unit 203, an associating unit 204, and a distance calculating unit 205.

The acquiring unit 201 acquires a series of picture frames from which a panorama image is created. Specifically, the acquiring unit 201 includes the camera 114 shown in FIG. 1. During shooting, the camera 114 takes in each one picture frame, which is the input unit of the pictures. Two consecutive picture frames are held in a frame buffer temporarily in order.

Figure 3:
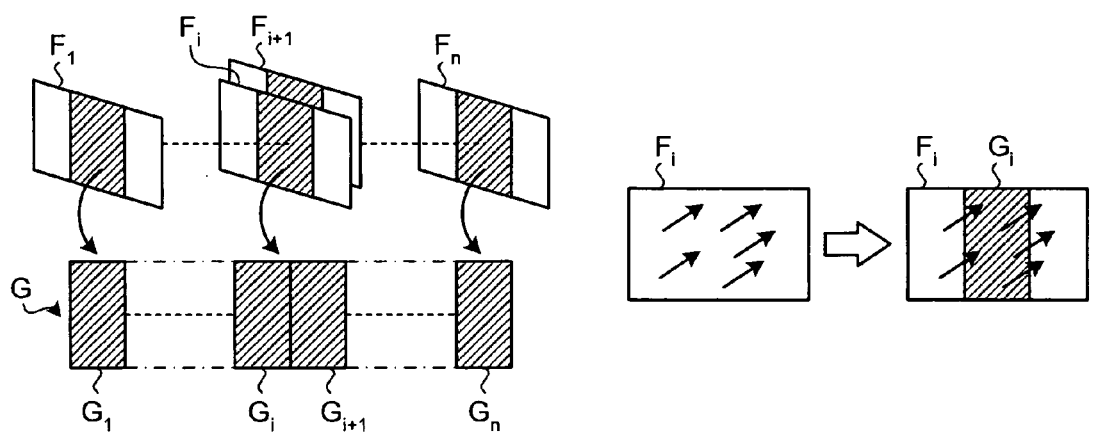
FIG. 3 is a schematic for illustrating a relation between picture frames and a panorama image.

The extracting unit 202 extracts an image composing a part of the panorama image (hereinafter, "partial panorama image") from each picture frame. FIG. 3 is a schematic for illustrating a relation between picture frames and the panorama image. Reference characters $F_1$ to $F_n$ stands for a series of picture frames. An image of a given width cut out from each picture frame $F_1$ to $F_n$ constitutes each partial panorama image $G_1$ to $G_n$. The partial panorama images $G_1$ to $G_n$ are connected sequentially in the chronological order to form the panorama image G.

When the camera 114 constituting the acquiring unit 201 is a video camera, to reduce an image distortion, a part of an image that is near the vertical centerline of the image plane is cut out from each video camera picture frame and each cutout partial image is connected as each partial panorama image $G_i$. A cutout width is not limited to a specific width, but may be determined to be a cutout width based on calculated optical flows as in the case explained in Japanese Patent Laid-Open Publication No. H11-164325. The cutout width may be a simple fixed value, or partially magnified.

When a line sensor camera is used with a video camera, the shooting position and shooting direction of the video camera is set identical with that of the line sensor camera. Since the shooting interval of the line sensor camera is shorter than that of the video camera, a group of slits produced by multiple times of shots by the line sensor camera in a shooting interval of the video camera are connected together to form the partial panorama image $G_i$.

The optical-flow calculating unit 203 calculates optical flows related to a picture frame $F_i$. As described later, optical flows include a large area optical flow and local optical flows. Unless defined otherwise, a single word "optical flow" means at least either large area optical flow or local optical flow.

The optical-flow calculating unit 203 searches for the destination of travel of a group of pixels (search window), and calculates local optical flows or a large area optical flow over the entire image plane based on the number of pixels in the search window, that is, the size of the search window.

For example, an area with a length and a width that are approximately ⅓ of that of an image plane is set in the center of the image plane, where the area is defined as a search window for a large area optical flow. As a search window for local optical flows, for example, blocks including subdivided areas of the image plane are used. A method of calculating optical flows can be such an ordinary method of searching for the destination of travel where the absolute value sum of the brightness differences of the pixel group in the search window becomes minimum, and defining the travel vectors of the pixels for the destination as the optical flows.

When the camera 114 constituting the acquiring unit 201 is a video camera, the amount of travel of pixels, which means optical flows, with regard to consecutive picture frames $F_i$, $F_{i+1}$ is calculated from pixel information in picture frames of the video camera.

When a line sensor camera is employed as the camera 114, the line sensor camera cannot provide pictures allowing calculation of optical flows. When a panorama image is created from the line sensor, therefore, a video camera for used in calculating optical flows must be prepared separately in such a way that the video camera is set in the same shooting position and shooting direction as the line sensor.

The associating unit 204 associates an optical flow value calculated by the optical calculating unit 203 with each pixel of a partial panorama image extracted by the extracting unit 202. Specifically, the associating unit 204 associates each optical flow calculated by the optical-flow calculating unit 203 with each pixel area of each partial panorama image $G_i$ obtained from a series of picture frames $F_1$ to $F_n$ taken by the camera 114. In this manner, flow map data is created.

Specifically, a pixel area corresponding to a search window (search window associated area) is detected in the partial panorama image $G_i$. The position of the search window associated area in a panorama image G is then calculated based on the pixel position in the partial panorama image $G_i$ that matches the detected search window associated area and the position taken by partial panorama image $G_i$ in the panorama image G. Optical flow values are then associated in correspondence with the position of the search window associated area in the panorama image G to make flow map data for the panorama image G.

For example, when a video camera is used as the camera 114, the partial panorama image $G_i$ is a part of an image frame $F_i$, for which optical flow calculation is created. Because of this, merely finding the location of cutout of the partial panorama image $G_i$ enables creation of a flow map for the partial panorama image $G_i$.

On the other hand, when a line sensor camera is used as the camera 114, the partial panorama image $G_i$ and an picture frame $F_j$ ($j \neq i$), for which optical flow calculation is created, is not the same in terms of image, so that the position coordinate in the partial panorama image $G_i$ cannot be taken to be the position coordinate in the picture frame $F_j$. In this case, the flow map for the partial panorama image $G_i$ is created by utilizing a corresponding relation shown in FIG. 4.

Figure 4:
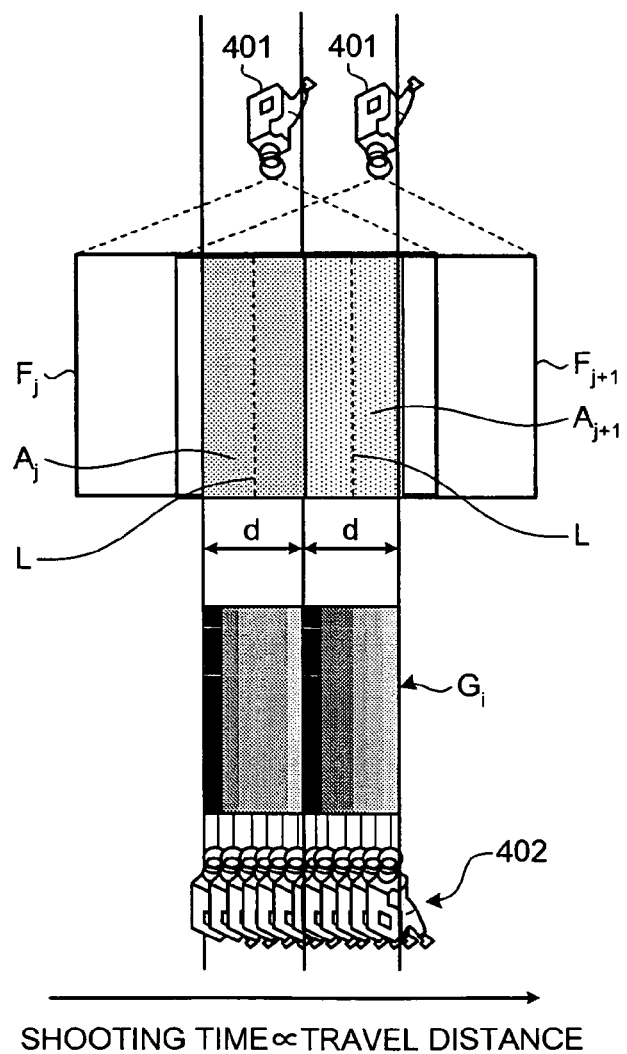
FIG. 4 is a schematic for illustrating correspondence between a picture obtained by a line sensor camera and a picture obtained by a video camera.

FIG. 4 is a schematic for illustrating correspondence between a picture obtained by a line sensor camera and that obtained by a video camera. As shown in FIG. 4, vertically elongated areas $A_j$, $A_{j+1}$, which are cutouts from the vicinity of the vertical centerlines L of picture frames $F_j$, $F_{j+1}$ from the video camera, each cutout having a large area optical flow width d, are regarded as the part that corresponds to the partial panorama image $G_i$ created by a line sensor camera 402. Each optical flow value is allocated from the areas $A_j$, $A_{j+1}$ to the partial panorama image $G_i$.

According to a method indicated in FIG. 4, a large area optical flow in the picture frame $F_j$ is considered to be a distance that a video camera 401 has traveled relative to the outside world in a shooting time for the consecutive picture frames $F_j$, $F_{j+1}$. The partial panorama image $G_i$ that is assumed to be the result of a shot covering the travel distance of the video camera 401 is associated in correspondence with a part that is shifted in the picture frames $F_j$, $F_{j+1}$ as the video camera 401 travels, that is, with the vertically elongated areas $A_j$, $A_{j+1}$ that are the cutouts having the large optical flow area widths 2d.

A method of associating the image of the line sensor camera and that of the video camera is not limited to the above one. A line of optical flows on the vertical centerlines L of the picture frames $F_j$, $F_{j+1}$ may be taken to be the entire optical flow of the partial panorama image $G_i$. In this case, the partial panorama image $G_i$ shows optical flow values all the same in the horizontal axis, that is, the optical flow values on the vertical centerlines L.

The distance calculating unit 205 shown in FIG. 2 calculates a distance from the camera 114 to a subject (subject distance) in the partial panorama image $G_i$ based on each optical flow value that is associated with each pixel in the partial panorama image $G_i$ by the associating unit 204. Specifically, for example, the distance between the camera 114 and the subject appearing in the panorama image G is calculated from the optical flows, using a flow map created by the associating unit 204. This allows a mere roadside image to be used with three-dimensional information including an element of distance (depth). A specific example of distance calculation will be described later.

In a specific operation, the acquiring unit 201, the extracting unit 202, the optical-flow calculating unit 203, the associating unit 204, and the distance calculating unit 205 exert their functions as the CPU 101 executes a program stored on the recording medium shown in FIG. 1, such as the ROM 102, the RAM 103, the HD 105, etc., or as the I/F 109 performs its function.

Figure 5:
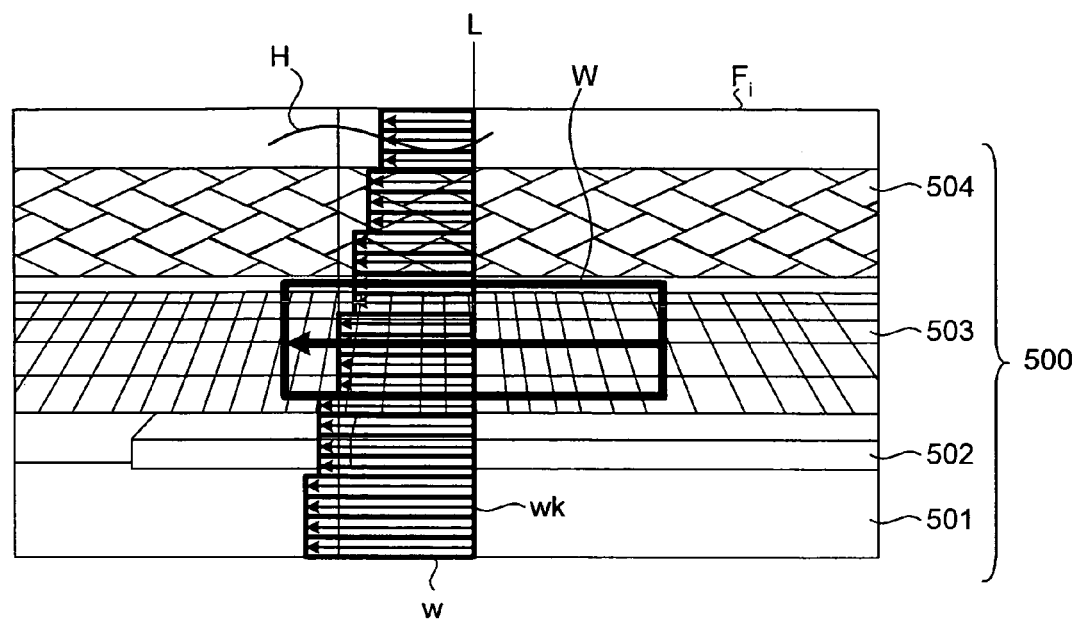
FIG. 5 is a schematic for illustrating optical flow calculation by an optical-flow calculating unit.

FIG. 5 is a schematic for illustrating optical flow calculation by the optical-flow calculating unit 203. A picture frame $F_i$ shown in FIG. 5 represents a roadside picture 500 taken from a mobile object on a road. The lower edge of the picture frame $F_i$ indicates the mobile object side, and the vertical direction of the picture frame indicates a dept from the mobile object. The picture frame $F_i$ includes images of a road 501, a curb 502, a sidewalk 503, and a wall surface 504.

A reference character L stands for the vertical centerline of the picture frame $F_i$, and a reference character W stands for a large area search window that is a large area optical flow calculation area. A thick arrow in the large area search window W represents a large area optical flow, and the length of the large area optical flow is the value of the same. A reference character H stands for a color histogram for the large area search window W.

A reference character w stands for local search window groups including local search windows wk (k is a given value representing a search window number) that are local optical flow calculation areas. Thin arrows in the local search windows wk represent local optical flows, and the length of the local optical flows is the value of the same.

In FIG. 5, the laterally elongated large area search window W is set in the center of the picture frame $F_i$, and the location of the large area search window W as a whole in the previous picture frame $F_{i-1}$ to the picture frame $F_i$ is determined from a pixel characteristic quantity. The large area optical flow is then determined from the amount of position shift of the large area search window W. In this case, to speed up a search process, the color histogram H, which shows a color change distribution, is used as the pixel characteristic quantity, instead of using the brightness of all pixels in the large area search window W, in searching for the location of a pixel area similar to the large area search window W.

Groups of local search windows w, each having a proper fixed width and a length approximately equivalent to 8 pixels, are set vertically on the vertical centerline L at an equal interval in the number of k (i.e., k=30). In the similar manner as calculation of the large area optical flow, the local optical flows numbering in k (30) are calculated as the amount of shift of the local search windows w from the previous picture frame $F_{i-1}$.

Practically, the local search windows wk are provided as such windows that have the same vertical size and vertical position as small rectangles shown in FIG. 5, and that have proper fixed widths given to the rectangles shifted to be aligned along the vertical centerline L. According to the case exhibited in FIG. 5, the local optical flows are calculated from the local search windows wk that are divided vertically of the picture frame $F_i$ in the number of k, and the local search windows wk are not divided horizontally. Accordingly, the associating unit 204 divides the partial panorama image $G_i$ vertically into k areas, and allocates each local optical flow to each divided area.

In the case exhibited in FIG. 5, only the horizontal amount of shift is calculated as the local optical flows. The local optical flows, however, may be calculated as both horizontal and vertical amount of shifts, that is, calculated as flow vectors having two kinds of values, and a flow map is created using such calculated optical flows.

Figure 6:
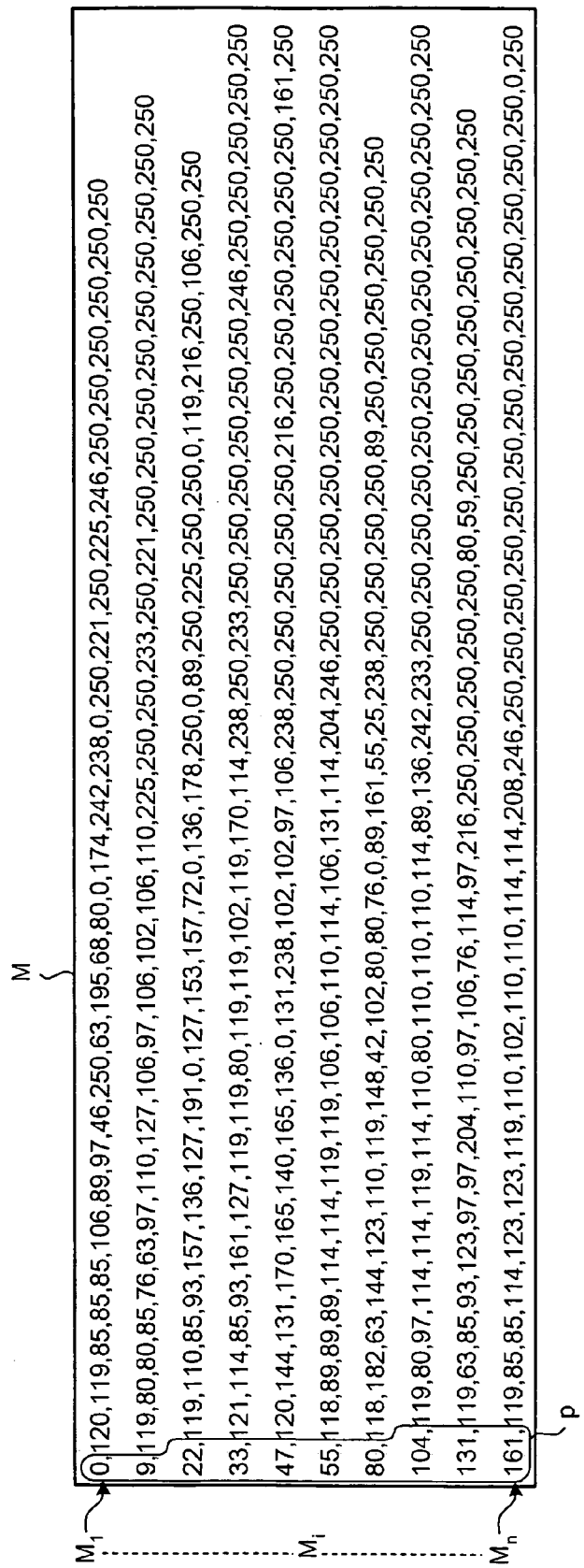
FIG. 6 is a schematic of a flow map created by an associating unit.

FIG. 6 is a schematic of a flow map created by the associating unit 204. The flow map M shown in FIG. 6 is, for example, made up of text data.

Each line in the flow map M represents flow map data $M_i$ for each partial panorama image $G_1$ (i=1 to n, n=11) The values at the head of the flow map data $M_i$ (values enclosed in an area P in FIG. 6), which is the left end of the flow map M, represent the pixel position of the partial panorama image $G_1$ in the panorama image G. Since the vertical size of the partial panorama image $G_1$ is identical with that of panorama image G, the values in the area P are the record that tells the horizontal pixel position, that is, the record that indicates at which pixel from the left end of the panorama image G the left end of the partial panorama image $G_1$ is positioned.

The values at the second onward in each flow map data $M_i$ (values outside the area P in FIG. 6) are recorded as local optical flow values compressed into values ranging from 0 to 255. In each flow map data $M_i$, the local optical flow values are recorded in the number of the local search windows wk (the number is k, where k=30 in FIG. 6).

While FIG. 6 depicts one example of the flow map M, the format of a flow map is not limited to one shown in FIG. 6. The format of the flow map is applicable as far as the format allows understanding of the correlation between a large area optical flow or local optical flows and the corresponding areas in the panorama image G and the pixel position of the areas. If possible, the flow map may be buried and held as metadata in the panorama image G.

Such distributed storage of the flow map is also applicable that a flow file containing optical flows not related to the partial panorama image $G_1$ is prepared, and the position of the optical flows related to the flow map M in the prepared flow file is written down. The local optical flow values may not be compressed into 0 to 255 but stored as they are.

Figure 7:
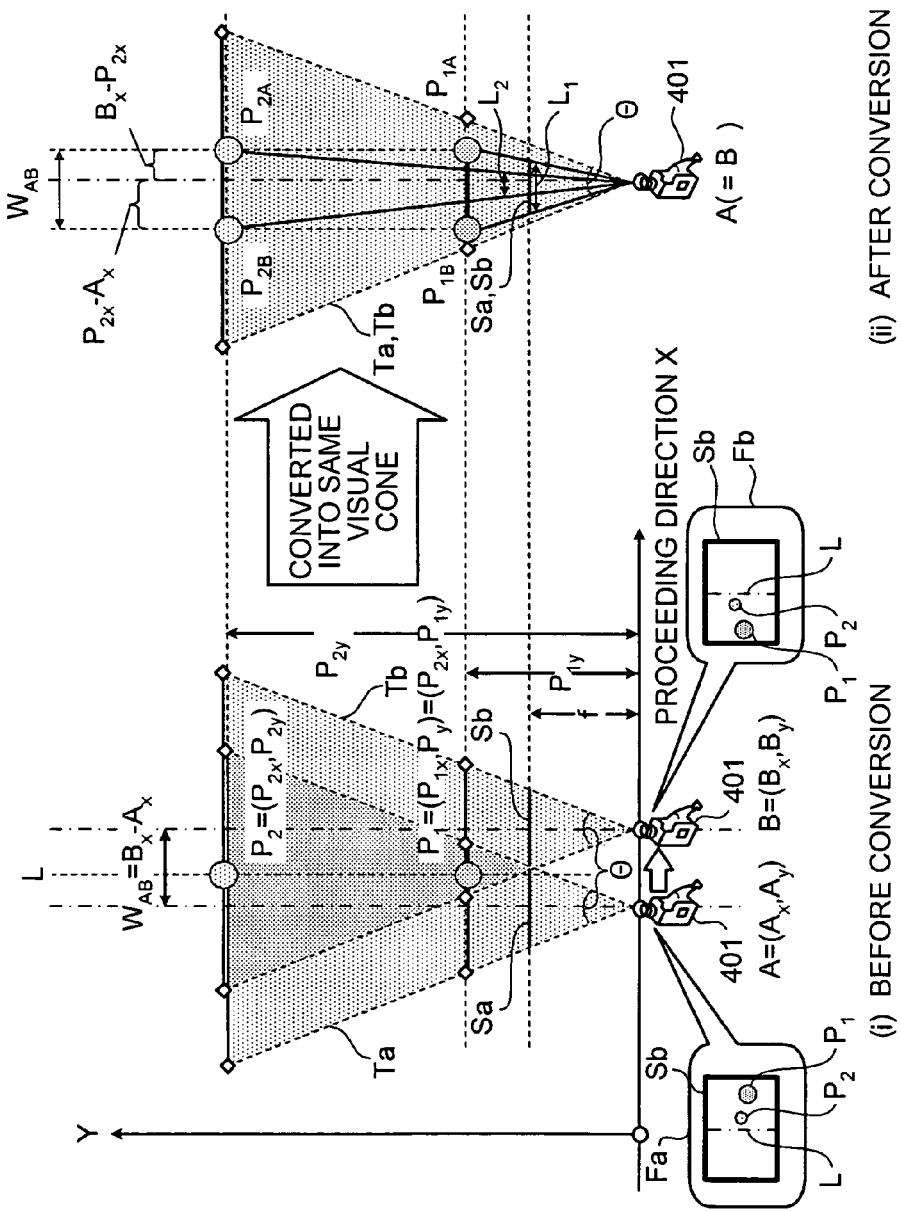
FIG. 7 is a schematic for illustrating subject distance calculation by a distance calculating unit.

FIG. 7 is schematic for illustrating subject distance calculation by the distance calculating unit 205. In the example shown in FIG. 7, the video camera 401 is used as the camera 114. In diagram (i) in FIG. 7, the horizontal axis represents the proceeding direction (X direction) of a mobile object (e.g. vehicle), and the vertical axis represents a distance indicating a depth (Y direction) from the video camera 401 on the mobile object. The subjects $P_1$, $P_2$ are present in the XY coordinate space.

The coordinate position of the subject $P_1$ is $(P_{1x}, P_{1y})$, and that of the subject $P_2$ is $(P_{2x}, P_{2y})$. For simplicity, the subjects $P_1$, $P_2$ are assumed to be aligned perpendicular to the proceeding direction X of the video camera 401, which gives $P_{1x}=P_{2x}$.

As shown in diagram (i), the video camera 401 captures the image of the subjects $P_1$, $P_2$ as the video camera 401 travels along with the mobile object from a coordinate position A $(A=(A_x, A_y))$ to a coordinate position B $(B=(B_x, B_y))$ $W_{AB}$ shown in diagram (i) stands for a distance difference between the coordinate position A and the coordinate position B, which is equivalent to a travel distance of the video camera 401, f stands for the focus distance of the video camera 401, Sa for the projection plane of the video camera 401 at the coordinate position A where the video camera 401 has the focus distance f, and Sb for the projection plane of the video camera 401 at the coordinate position B where the video camera 401 has the focus distance f.

Ta stands for a visual cone representing the shooting space of the video camera 401 at the coordinate position A, while Tb stands for a visual cone representing the shooting space of the video camera 401 at the coordinate position B. Θ stands for the image angle of the visual cone Ta and of the visual cone Tb. The image angle does not change in this example.

Fa stands for a captured image projected on the 35 millimeters (mm) size film of the video camera 401 at the coordinate position A, while Fb stands for a captured image projected on the 35 mm size film of the video camera 401 at the coordinate position B. L stands for the vertical centerline of each image plane (projection plane Sa, Sb). Actually, the video camera 401 is not a silver salt camera, therefore the captured image is projected on a shooting element. In this example, however, the captured image is assumed to be projected on the 35 mm size film of 36 mm by 24 mm. The captured image on the 35 mm size film is projected on a display screen having vertical/horizontal pixels of $g_x \times g_y$ in number to be presented as a picture frame.

In diagram (ii), the coordinate positions A, B shown diagram (i) are located in the same position. Accordingly, in diagram (ii), the subject $P_1$ is described as a subject $P_{1A}$, which is at the coordinate position corresponding to the video camera 401 at the coordinate position A, and as a subject $P_{1B}$, which is at the coordinate position corresponding to the video camera 401 at the coordinate position B. As a result, the distance between the subjects $P_{1A}$, $P_{1B}$, that is, a difference in distance in the X direction between the subjects $P_{1A}$, $P_{1B}$ is given as the travel distance $W_{AB}$ of the video camera 401.

Likewise, in diagram (ii), the subject $P_2$ is described as a subject $P_{2A}$, which is at the coordinate position corresponding to the video camera 401 at the coordinate position A, and as a subject $P_{2B}$, which is at the coordinate position corresponding to the video camera 401 at the coordinate position B. As a result, the distance between the subjects $P_{2A}$, $P_{2B}$, that is, a difference in distance in the X direction between the subjects $P_{2A}$, $P_{2B}$ is given as the travel distance $W_{AB}$ of the video camera 401.

Hence, the optical flow values $M_1$, $M_2$ of the subjects $P_1$, $P_2$ on the projection planes Sa, Sb, which have horizontal pixels numbering in $g_x$ as shown in diagram (i), are represented as actual travel distances $L_1$, $L_2$ on the 35 mm size film corresponding to the projection planes, that is, the film of 36 mm wide separated from the video camera 401 by the focus distance f in diagram (i). This conclusion is expressed in Equations 1, 2, 3, and 4, as shown below. The optical flow values $M_1$, $M_2$ are inversely proportional to the distances $P_{1y}$, $P_{2y}$, showing the depth from the video camera 401 to the subjects. The reciprocal of the ratio of the optical flow value $M_1$ to $M_2$ is, therefore, equal to the ratio of the distance $P_{1y}$ to $P_{2y}$ (see Equation 5 below)

$$M_1 = L_1 \cdot g_x / 36 \quad (1)$$

$$M_1 = L_2 \cdot g_x / 36 \quad (2)$$

$$L_1 = f(P_{1x} - A_x)/P_{1y} + f(B_x - P_{1x})/P_{1y} = f \cdot W_{AB}/P_{1y} \quad (3)$$

$$L_2 = f(P_{2x} - A_x)/P_{2y} + f(B_x - P_{2x})/P_{2y} = f \cdot W_{AB}/P_{2y} \quad (4)$$

$$M_1/M_2 = L_1/L_2 = P_{2y}/P_{1y} \quad (5)$$

To calculate subject distances $P_{1y}$, $P_{2y}$ from the values $L_1$, $L_2$ representing respective optical flow values $M_1$, $M_2$, Equations 6 and 7 below are used. Equations 6 and 7 are derived by transforming the above Equations 1, 2, 3, and 4.

$$P_{1y} = f \cdot W_{AB}/L_1 = f \cdot W_{AB} \cdot g_x / 36 \cdot M_1 \quad (6)$$

$$P_{2y} = f \cdot W_{AB}/L_2 = f \cdot W_{AB} \cdot g_x / 36 \cdot M_2 \quad (7)$$

Unless the video camera 401 is manipulated in a specific manner, the focus distance f can be given as a fixed constant value common to every picture frame $F_i$. Because of this, the product of the distance difference $W_{AB}$ of the video camera 401 and the focus distance f ($f \cdot W_{AB}$) is a constant value independent from the subjects (independent from the distance between the subjects and the video camera 401). The size of the camera film (36 mm) used at the focus distance and the number of pixels ($g_x$) on the display screen corresponding to the film are also constant values. Because of this, when the relative ratio between the travel distance $W_{AB}$ between the coordinate positions A, B of the video camera 401 that is projected on the compared two picture frames Fa, Fb, and the travel distance (e.g. $W_{CD}$) between other coordinate positions (e.g. C, D) of the video camera 401 that is projected on other compared two picture frames (e.g. Fc, Fd) is known, multiplying each optical flow value by the known relative ratio provides pseudo subject distances. The pseudo subject distances can apply to the panorama image G as a whole in a consistent manner.

When the travel distance $W_{AB}$ is large, the travel distance of pixels on the entire part of screen becomes also large, which means the large area optical flow becomes large. This allows an option of simply substituting a large optical flow ratio for the above relative ratio. By doing so, the subject distances can be calculated only from pictures without using values given by an external sensor, such as a global positioning system (GPS), vehicle speed sensor, etc.

Another option is available such that the distance difference $W_{AB}$ of the video camera 401 and the focus distance f for each picture frame $F_i$ are measured using a non-illustrated external sensor, and subject distances for each picture frame and each pixel area are calculated precisely using the measured distance difference $W_{AB}$ and focus distance f.

The video camera 401 operates at a shooting speed of 60 frame/second without employing the interlace method specified by NTSC (National Television Standard Committee). With this shooting speed, the video camera 401 travels a distance of 0.278 m in terms of a picture frame when the video camera 401 travels at a speed of 60 km/h (16.67 m/s). Under this condition, accurate calculation of the subject distances requires precision in the unit of 10 cm.

As shown in the above Equation 5, the optical flow values reciprocate to the subject distances. This allows an option of simply using the reciprocation of optical flows as pseudo subject distances. Optical flow values and subject distances derived from the optical flow values may be used after undergoing various types of proper corrections such that a value standing out from other peripheral values is regarded as an error in optical flow calculation to be invalidated, or that standing out values are rounded off by taking each value to be a force field at each point of a spring model mesh and letting each value pull one another.

Figure 8:
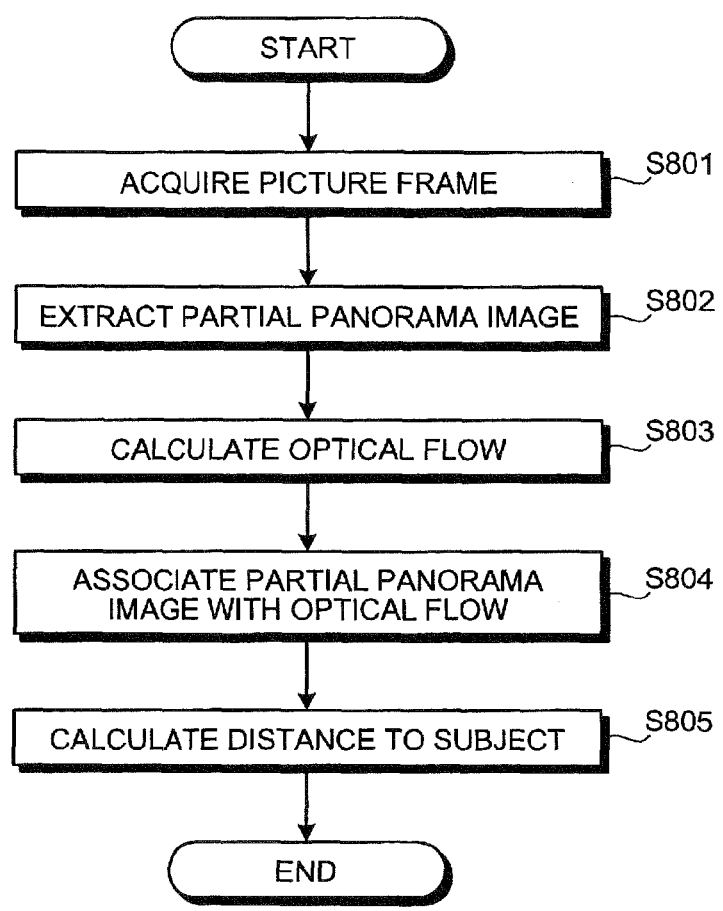
FIG. 8 is a flowchart of an image analysis procedure executed by the image analyzing apparatus.

FIG. 8 is a flowchart of an image analysis procedure executed by the image analyzing apparatus 200 according to an embodiment of the present invention. As shown in FIG. 8, the acquiring unit 201 acquires a series of picture frames $F_i$ from the camera 114 (step S801). The extracting unit 202 then extracts partial panorama images $G_i$ from the obtained picture frames $F_i$ (step S802). The optical-flow calculating unit 203 calculates optical flows related to each picture frame $F_i$ (step S803) in such a manner as described in the above optical flow calculation example.

Subsequently, the associating unit 204 associates each partial panorama images $G_i$ with optical flow values (step S804). The partial panorama image $G_i$ can be associated with the optical flow values by, for example, creating the flow map M as described above. The distance calculating unit 205 then calculates a subject distance from the optical flow values associated with the partial panorama images $G_i$ (step S805) in such a manner as described in the above subject distance calculation example.

An example of utilizing such distance that corresponds to the panorama image G is provided in a form of estimation of the identity of a subject on the panorama image G. This is created possible by examining a change and a distribution pattern with regard to distance in the depth direction. For example, when the depth (distance) from the camera 114 abruptly indicates the infinite distance and then returns to a normal indication after several seconds, such a pattern can be presumed to be a pattern that appears when the camera 114 passes through an intersection. Information obtained like this can be used to correct existing positional information given by a GPS, etc.

In another example, an abrupt appearance of a rectangular projection pattern closer to the camera 114 can be considered to be a projection of a parking vehicle. This allows a worker to narrow down candidates for a place where on-street parking is frequent before perusing the panorama image G. Such example of using distance patterns will be detained later.

The principle of the embodiments of the present invention described heretofore does not limit various applications of the principle. The principle can apply to the following application patterns:

1. not calculating a large area optical flow
2. calculating optical flows first and using the calculated optical flows also upon creating a partial panorama image $G_i$
3. calculating a part in a picture frame that is likely to be involved in the partial panorama image $G_i$ in advance and calculating only the local optical flows for the part
4. subdividing the local search windows wk also laterally
5. calculating optical flows using the color tendency (histogram), etc. of local search windows wk as a whole instead of using the brightness of all pixels in the local search windows wk
6. calculating local optical flows using local search windows wk given by further subdivision of a complicated part in the partial panorama image $G_i$ after examining complicatedness inside the partial panorama image $G_i$ by edge extraction or color distribution check
7. dividing the partial panorama image $G_i$ into some areas by edge extraction, etc. and mapping out local optical flows for every divided area The associating unit 204 for creating the flow map M and the distance calculating unit 205 for calculating a subject distance are not necessarily within a single system. A system having the associating unit 204 and a system having the distance calculating unit 205 using the flow map M may be provided separately.

According to the embodiments of the present invention, for roadside analysis, a large optical flow or local optical flows are calculated from the partial panorama image $G_i$, which is an obtained picture of a roadside, in addition to a conventional panorama image G as a captured image of the roadside. The calculated optical flows are associated with their position in the panorama image G to form the flow map M. With the flow map M, a distance to a subject (subject distance) is calculated and used to be able to narrow down a part to see in the panorama image G, or to correct positional information corresponding to the subject. Trouble in analyzing a roadside is thus reduced.

A first embodiment of the present invention is an example of presenting a stable judgment on the identity of a subject based on a subject distance and also of a distance pattern showing a change in the subject distance. The same composition as the composition described above is given the same reference character and is not explained further.

Figure 9:
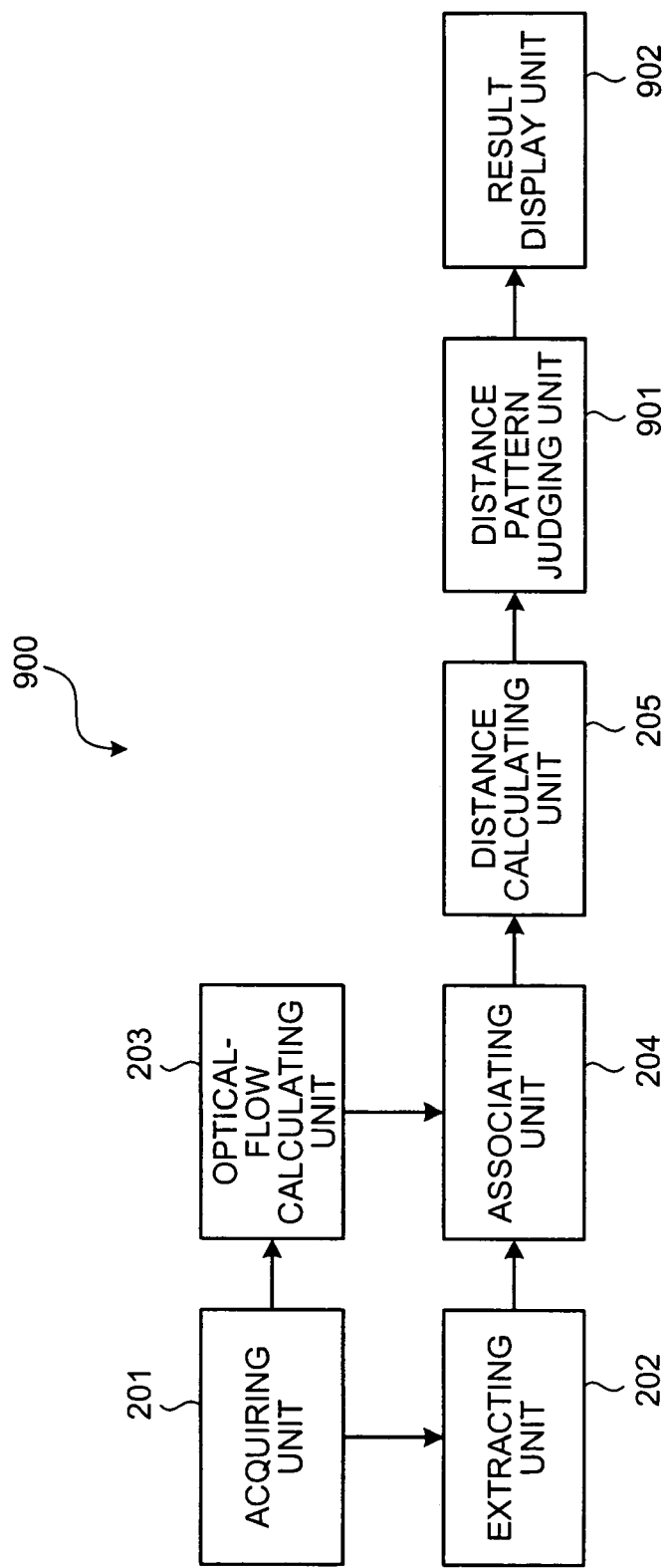
FIG. 9 is a block diagram of a functional configuration of an image analyzing apparatus according to a first embodiment of the present invention.

FIG. 9 is a block diagram of an image analyzing apparatus 900 according to the first embodiment. The image analyzing apparatus 900 includes the components shown in FIG. 2 including the acquiring unit 201, the extracting unit 202, the optical-flow calculating unit 203, the associating unit 204, and the distance calculating unit 205. The image analyzing apparatus 900 also includes a distance pattern judging unit 901, and a result display unit 902.

The distance pattern judging unit 901 identifies a subject in a panorama image G. Specifically, for example, the distance pattern judging unit 901 has distance patterns indicating subject distance changes, and registered patterns providing a reference on how to interpret the appearance of a subject distance change. For example, the distance pattern judging unit 901 judges a rectangle appearing abruptly on this side of the panorama image G to be a registered pattern for a parking vehicle, or judges a distribution pattern showing an infinite distance to be a registered pattern for an intersection. The distance pattern judging unit 901 compares these patterns to the distance patterns to identify a subject.

Figure 10:
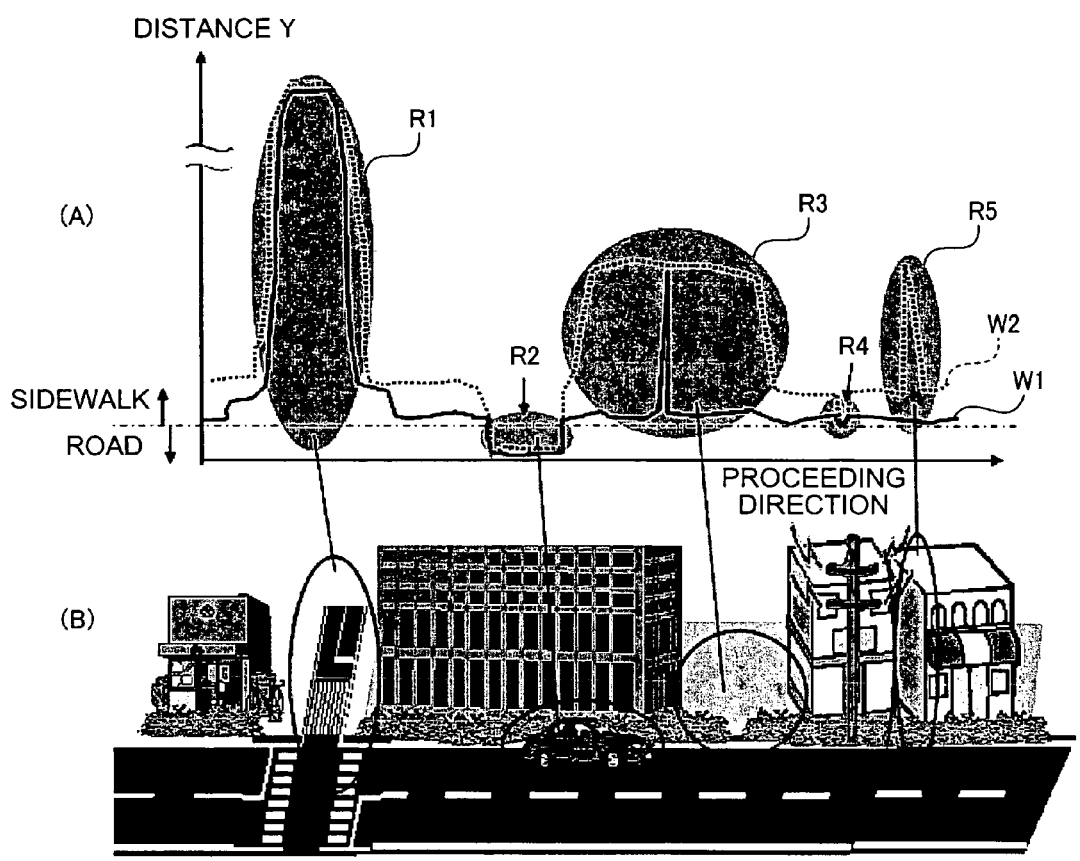
FIG. 10 is a schematic of distance patterns according to the first embodiment.

FIG. 10 is a schematic of distance patterns. Diagram (A) is a graph of the waveforms of distance patterns, and diagram (B) illustrate the roadside corresponds to the waveforms. The horizontal axis of the graph represents the proceeding direction (X direction) of a mobile object, and the vertical axis of the graph represents a distance indicating a depth (Y direction) from the video camera 401 on the mobile object.

A waveform W1 drawn with a solid line is a distance pattern representing the depth at the level of 60 pixels from the lower edge of a panorama image G. A waveform W2 drawn with a dotted line is a distance pattern representing the depth at the level of 130 pixels from the lower edge of the panorama image G. An actual flow map data M (see FIG. 6) and a calculated subject distance include height data corresponding to the vertical image angle of the panorama image G. Because of this, the waveforms W1, W2 represent sectional shapes given by cutting shapes formed by the calculated subject distance laterally at the level of 60 pixels and 130 pixels.

As indicated by the waveform W1, a line representing a hedge (drawn with a single-dot chain line in diagram A in FIG. 10), etc. is recognized as the boundary between a sidewalk and a road, and whether or not an object is on the road can be judged by seeing whether the object is on the upper part of the vicinity of the boundary or on the lower part of the same. As a result, a peak area R1 appearing as a rectangle indicating an infinite distance irrespective of height is judged to be an another road at an intersection. A peak area R2 appears as a rectangle of a certain size and height on the road, and is judged to be a parking vehicle.

A peak area R3 appears as a rectangle caving in heavily at the level of 130 pixels (caving in at the spot where the hedge breaks at the level of 60 pixels), and is judged to be a vacant lot. A peak area R4 appears as a small rectangle shaped in a high pole at the boundary between the road and the sidewalk, and is judged to be a utility pole. A peak area R5 projects steeply in the direction of depth (Y direction) only at the level of 130 pixels, and is judged to be a gap between buildings.

While an element of height is described in terms of pixels for simplicity here, the height of a subject can be estimated from parameters including the position of the subject in the panorama image G, the distance from the subject to the camera 114, the height of the camera 114 itself, and the focus distance f.

Figure 11:
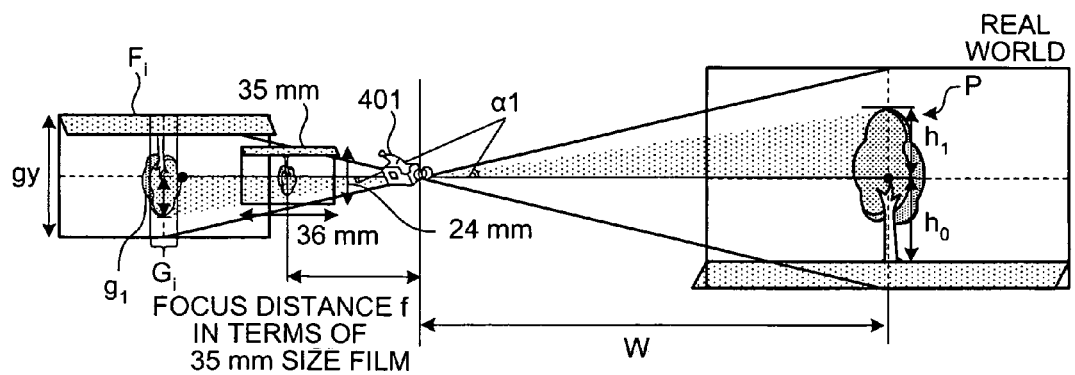
FIG. 11 is a schematic for illustrating estimation of height of a subject according to the first embodiment.

FIG. 11 is a schematic for illustrating estimation of height of a subject according to the first embodiment. One method of estimating height h of the subject P is described using a partial panorama image $G_i$ created on the video camera 401, as shown in FIG. 11.

The whole of an picture film $F_i$ obtained by the video camera 401, from which picture film $F_i$ the partial panorama image $G_i$ is cut out, is converted into one frame of a 35 mm size film. An image angle α1 can be calculated when the ratio of a distance g1 to the number of pixels ½ gy is given, the distance g1 being the distance from the center of the image film $F_i$ to the subject P and the number of pixels ½ gy being the number of pixels in the vertical half of the image plane of the image film $F_i$.

A distance Y1 from the center of the 35 mm size film to the subject P, the subject P being projected from the image film $F_i$ of the video camera 401 into the 35 mm size film, is also calculated. Since the video camera 401 is not a silver salt camera, as mentioned in FIG. 7, the subject P is actually projected on a shooting element, but the subject P is assumed to form its image on the 35 mm size film here.

The ratio of the focus distance f of the video camera 401 in terms of the 35 mm size film to a relative distance W is equal to the ratio of the distance from the center of the 35 mm size film to the subject P to the size of the subject in the real world, which means the ratios are defined by the same image angle α1. From this fact, height h1 of the subject P from the center of the video camera 401 can be determined.

Height hc of the center of the video camera 401 from the ground is added to the height h1 to determine the height h of the subject P from the ground (see Equations 8 to 10 below).

$$g_1/g_y = Y_1/24 \quad (8)$$

$$h_1 = W \cdot Y_1/f = (24 \cdot g_1 \cdot W)/(f \cdot g_y) \quad (9)$$

$$h = h_1 + h_c = (24 \cdot g_1 \cdot W)/(f \cdot g_y) + h_c \quad (10)$$

Each of the total number gy of pixels in the image frame $F_i$, the height hc of the video camera 401, and the focus distance f in terms of the 35 mm size film can be given as a constant value. This allows estimation of the approximate height h of the subject P when the position $g_1$ of the subject P in the partial panorama image $G_1$, and the relative distance W from the video camera 401 to the subject P, which is calculated from optical flow values given at the position $g_1$, are known.

The distance pattern judging unit 901 checks a subject distance pattern, which indicate a change in a subject distance at every calculated position in the panorama image, and judges on to which registered pattern of the ground object the checked subject distance pattern matches and on the level of probability of matching.

The result display unit 902 displays the completed panorama image G. The result display unit 902 may extracts and display a part of the panorama image G for perusal, using a judgment given by the distance pattern judging unit 901, or display a list of judgments.

The result display unit 902 may also display a map corresponding to the panorama image G, a subject distance determined from optical flows, the optical flows themselves together with the panorama image G, or the optical flows as a substitute for the panorama image G. A judgment is displayed as a result according to the first embodiment, but may be stored in the device at the position of the panorama image G for reuse. The image analyzing apparatus according to the first embodiment allows perusal of the panorama image with candidates to be checked, such as a section where lots of vehicles park, the vicinity of a intersection, etc., narrowed down beforehand, thus saves trouble in perusal and analysis work.

A second embodiment of the present invention is an working example of the execution of route correction in addition to use of subject distances and distance patterns. The same composition as the composition described in the above embodiments including the first embodiment is given the same reference character, and is not explained further.

Figure 12:
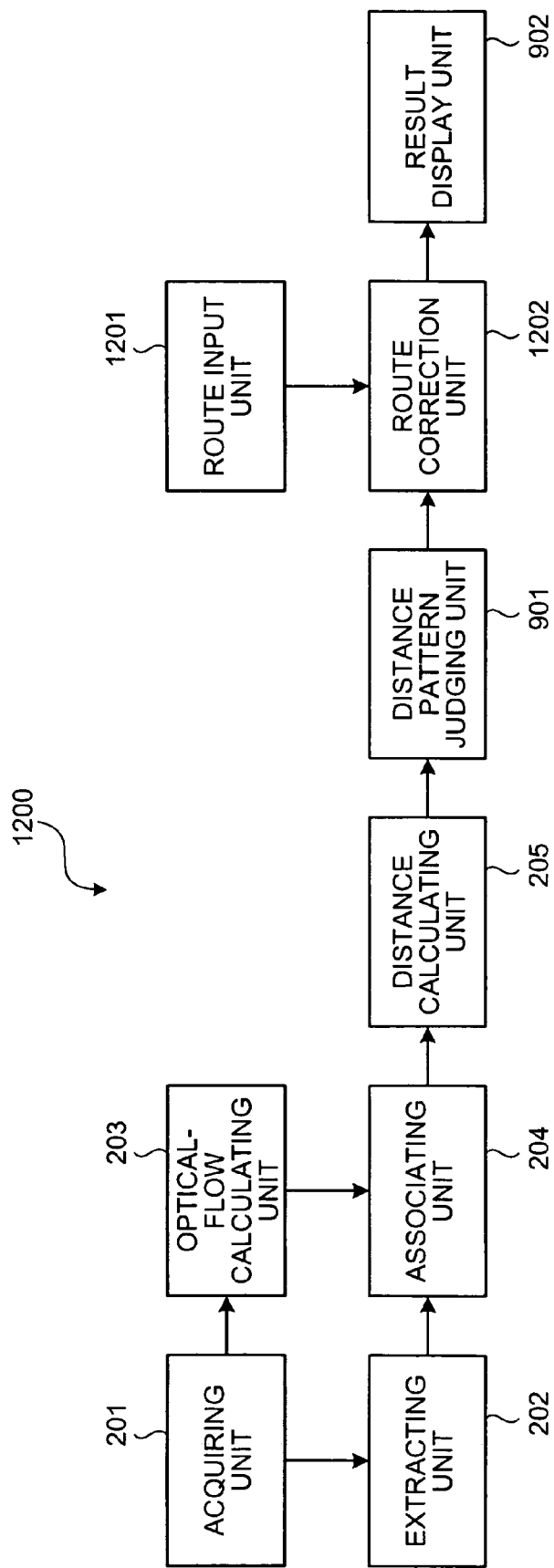
FIG. 12 is a block diagram of a functional configuration of an image analyzing apparatus according to a second embodiment of the present invention.

An image analyzing apparatus according to the second embodiment is described. FIG. 12 is a block diagram showing the functional structure of the image analyzing apparatus according to the second embodiment. The image analyzing apparatus 1200 shown in FIG. 12 includes the components shown in FIG. 2 or 9 which include the acquiring unit 201, the extracting unit 202, the optical-flow calculating unit 203, the associating unit 204, and the distance calculating unit 205, the distance pattern judging unit 901, and the result display unit 902. The image analyzing apparatus 1200 also includes a route input unit 1201, and a route correction unit 1202.

The route input unit 1201 shown in FIG. 12 inputs the travel route and position data of a mobile object (e.g. vehicle) that correspond to each part of a panorama image G. Position data provided by a GPS currently in use shows much positional errors especially on such a place that is under an elevated facility, between buildings, etc, failing to constantly offer accurate position information in a precise manner.

The travel distance of the mobile object can be measured only in a vehicle speed pulse unit, and the travel distance of the object measured by an inertial measuring device contains a substantial error. Because of this, position data obtained by a dedicated sensor in the mobile object using the elements of a travel distance and a travel direction contains accumulated multiplicative positional errors for each several to ten meters range, thus presents only the rough position data with less precision.

For the above reasons, the travel route and position data input by the route input unit 1201 are expected to be devoid of precision to some extent. This lack of precision poses no problem because the data is to be corrected later. The distance pattern judging unit 901 judges on the identity of a subject based on a distance pattern. For example, the distance pattern judging unit 901 registers a pattern for an intersection as a ground object, and judges on matching of the registered pattern for the intersection to a distance pattern.

The route correction unit 1202 corrects the route and position data corresponding to each part of the panorama image G, using a judgment on a distance pattern. For example, such a case is assumed for a part of the panorama image G that a judgment on a distance pattern suggests that the mobile object is at the second intersection from the start of the panorama image G while route and position data input from a GPS, etc. by the route input unit 1201 suggests that the object has passed over the second intersection to be several meters away from there.

In this case, the judgment on the distance pattern is given priority to correct the route and position data for the panorama image G so that the mobile object is determined to be at the intersection. In the panorama image G, a part between corrected parts, that is, noncorrectd part may also be corrected, if necessary, simply by linear interpolation, using such a correction result. Instead of a linear interpolation process, an interpolation process weighted in proportion to a change in the value of a large area optical flow, the change being considered to be a pseudo camera speed, may be executed for correction.

The result display unit 902 makes display for roadside analysis using the corrected, more accurate route and position data. For example, the result display unit 902 displays the route and the current position of the mobile object on a map, together with the panorama image G. When position information of a subject to be seen is given, the result display unit 902 can extract and display a part of the panorama image G that is expected to bear the image of the subject in a more accurate manner. For example, the result display unit 902 is capable of selecting the subject from a map, and searching and displaying a part in the panorama image G that is related to the subject.

The image analyzing apparatus can be used as a system that has no result display unit 902, and that is dedicated for correction of route and position data. Such a system is used for applications other than perusal of the panorama image G. According to the second embodiment, the image analyzing apparatus corrects route and position data given by a GPS, vehicle speed sensor, etc. properly, thus corrects the route and position data corresponding to each part of the panorama image G into more accurate one.

The image analyzing apparatus of the second embodiment executes positional interpolation of position data given only in the unit of a camera, that is, in the unit of a panorama image $G_i$ in a highly precise manner, using distance pattern judgments. This allows the utilization of such position data as position data of each subject in the panorama image $G_i$.

The image analyzing apparatus of the second embodiment corrects and improves the precision of route and position data from a GPS, vehicle sensor, etc., using a flow map and distance pattern judgments, and executes the positional interpolation to obtain route and position data of each part in the panorama image $G_i$. When highly precise data or detailed information is not necessary, the route and position data from a GPS, vehicle sensor, etc. may be associated in correspondence with the panorama image G in the unit of partial panorama image $G_i$ without executing particular data correction and interpolation, or with the execution of only correction, or with execution of only interpolation.

According to the second embodiment, camera parameters such as panning, tilting, etc., and information of a shooting direction, camera height, shooting time, etc. may be stored simply or interpolatively, in addition to the storage of route and position data. Ground object information provided by distance pattern judgment may also be stored and used.

Figure 13:
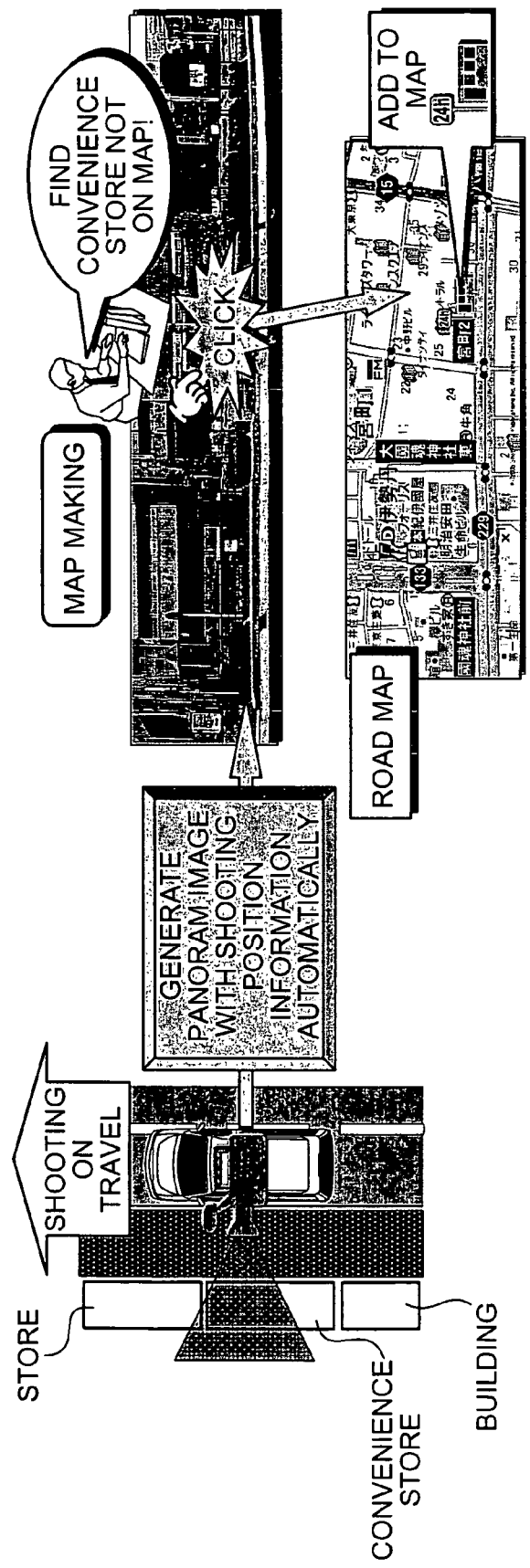
FIG. 13 is a schematic of a system using a result obtained by associating position data with a panorama image according to the second embodiment.

The second embodiment allows practical application of a result of association of position data in correspondence with a panorama image. FIG. 13 is a schematic diagram showing a system for using a result of association of position data in correspondence with a panorama image.

In FIG. 13, a user selects an area of interest in the panorama image G while perusing the panorama image G. The user obtains a shooting position associated in correspondence with the area of interest, and is able to presume the presence of a subject or its position based on the shooting position or camera parameters. The user, therefore, can presume the presence of the subject and its position on a map by only selecting the corresponding area on the panorama image G, thus be able to easily compile data base information, such as additional registration of store information. The second embodiment, therefore, allows the construction of a compiling system irrespective of correction or noncorrection of GPS-based position data through the flow map M.

A third embodiment of the present invention is an example of creating of three-dimensional shape data of a subject that has irregularities corresponding to optical flow values. The same composition as the composition described in the above embodiments including the first and the second embodiments is given the same reference character, and is not explained further.

Figure 14:
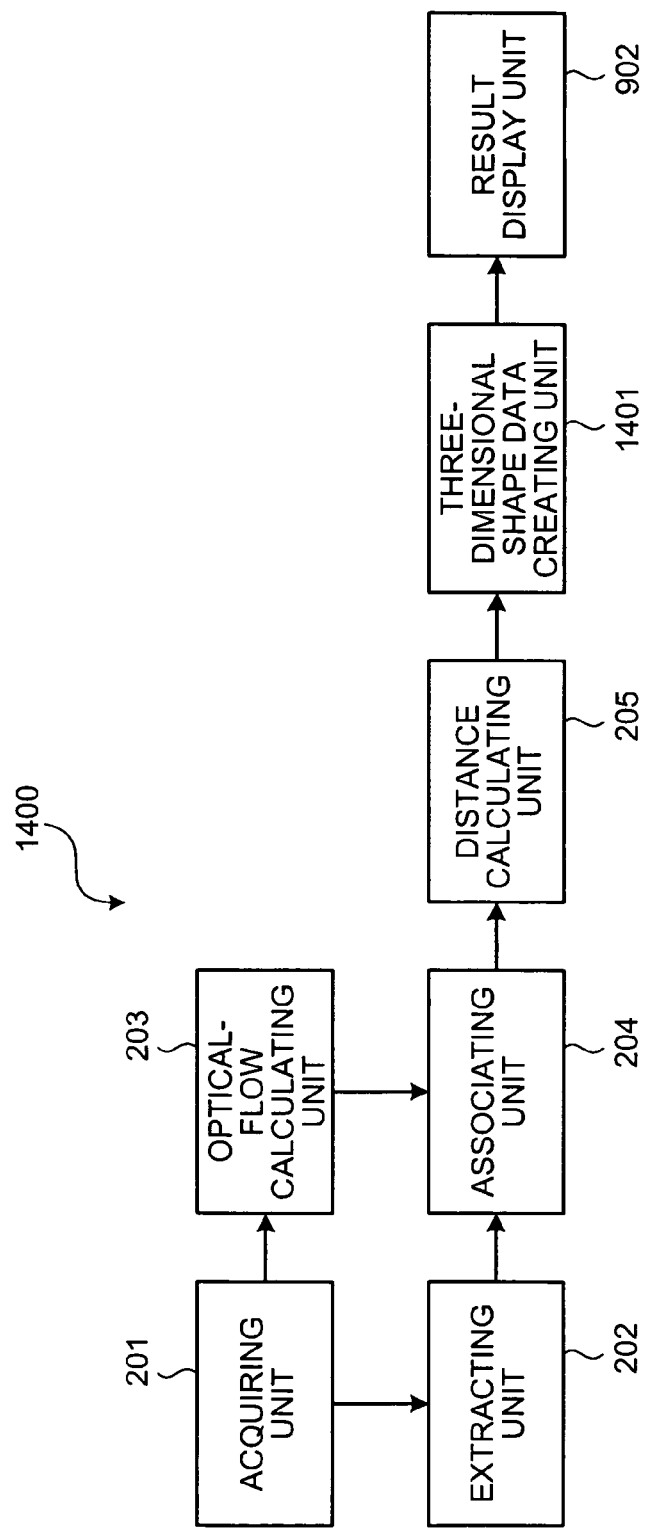
FIG. 14 is a block diagram of a functional configuration of an image analyzing apparatus according to a third embodiment of the present invention.

FIG. 14 is a block diagram of an image analyzing apparatus 1400 according to the third embodiment. The image analyzing apparatus 1400 shown in FIG. 14 includes the components shown in FIG. 2 or 9 which include the acquiring unit 201, the extracting unit 202, the optical-flow calculating unit 203, the associating unit 204, and the distance calculating unit 205, and the result display unit 902. The image analyzing apparatus 1400 also includes a three-dimensional shape data creating unit 1401.

The three-dimensional shape data creating unit 1401 makes three-dimensional shape data of a subject that has irregularities, using the position coordinates of the subject given by a flow map M, that is, the position coordinates in a panorama image G plus optical flow values at the coordinates in the depth direction or the subject's distance to the camera 114 that is derived from the optical flow values.

Such a shape with irregularities is defined as a rectangular or triangular mesh shape or such a shape that is formed by superposing contour-like solids one another. The result display unit 902 displays created three-dimensional shape data. For example, pasting the panorama image G as a texture on the three-dimensional shape data allows perusal of the synthesized panorama image G offering a greater sense of presence than a simple panorama image G.

Figure 15:
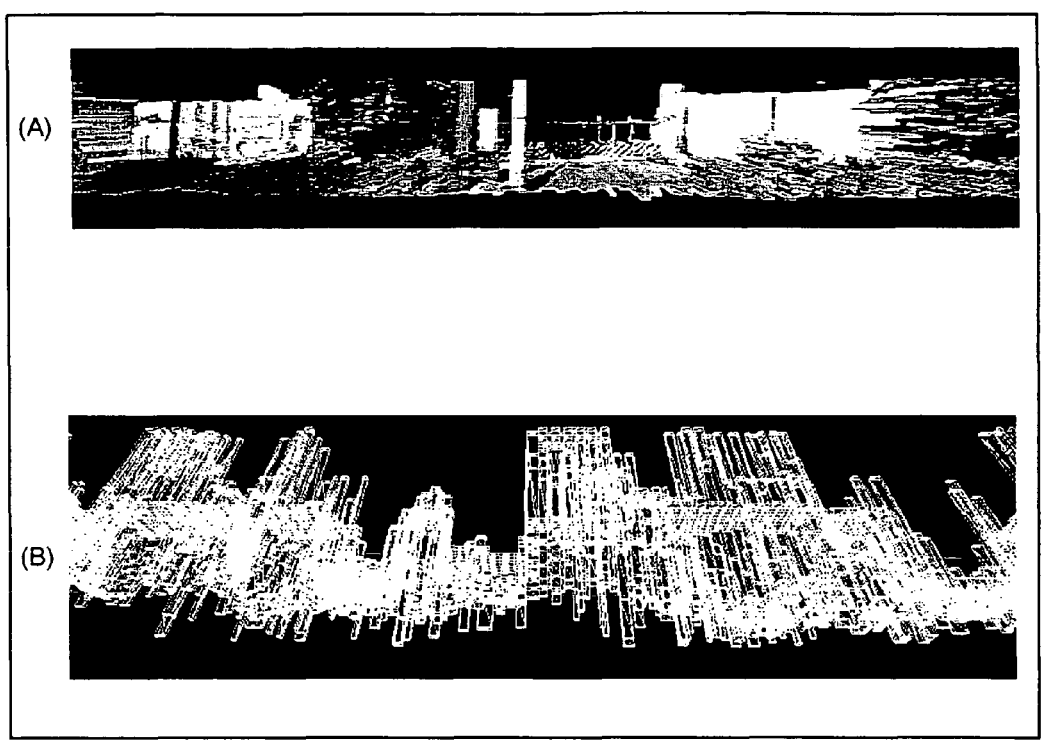
FIG. 15 is a schematic for explaining data of three-dimensional shape.

An example of three-dimensional shape data is exhibited in FIG. 15. The example shown in FIG. 15 is three-dimensional shape data actually created using a rectangular mesh and texture-mapping the panorama image G on the three-dimensional shape. Diagram (A) in FIG. 15 illustrates the three-dimensional shape data with the texture-mapped panorama image G, while diagram (B) in FIG. 15 illustrates the three-dimensional shape data without the texture-mapped panorama image G.

Figure 16:
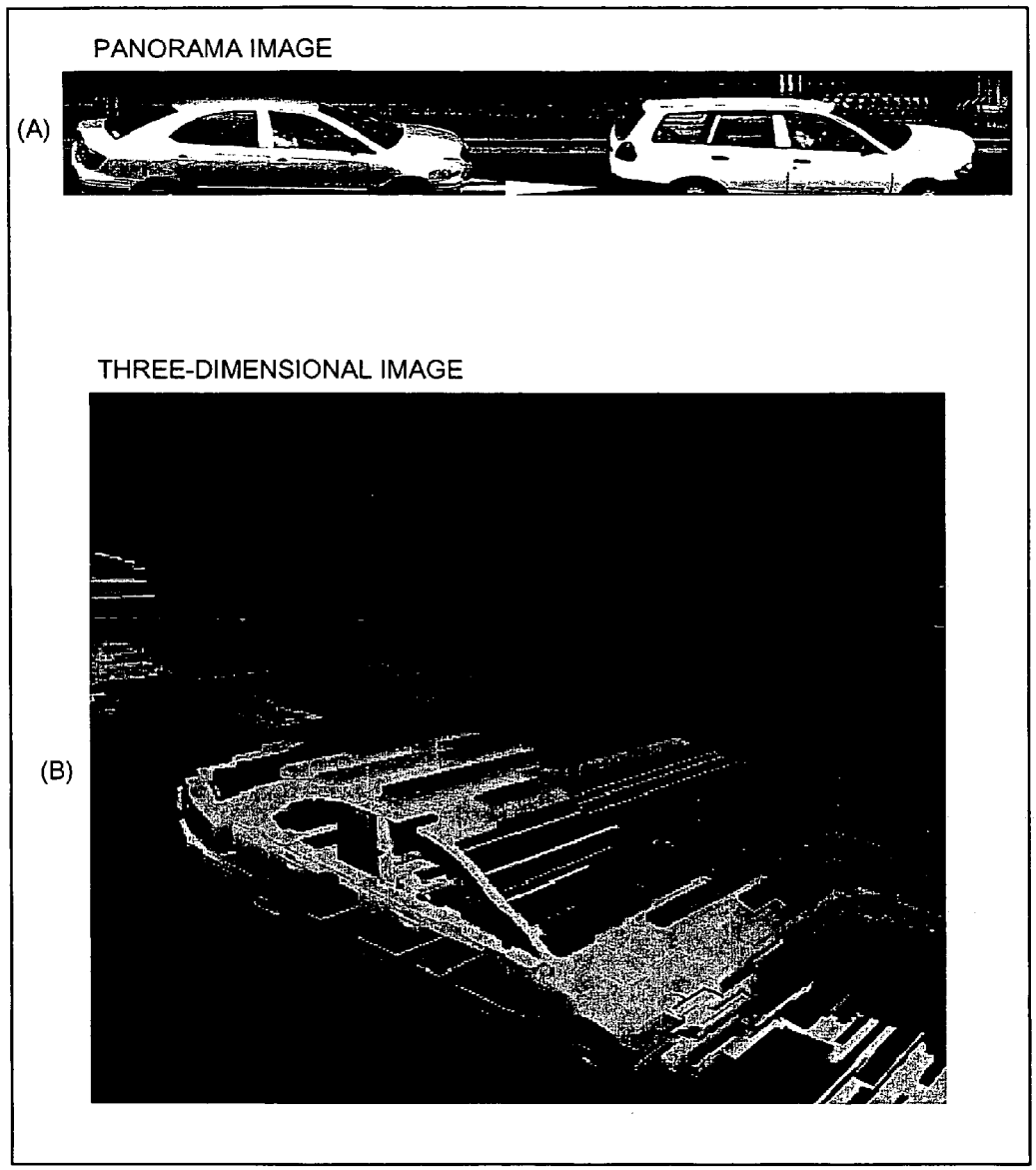
FIG. 16 is another schematic for explaining data of three-dimensional shape.
Figure 17:
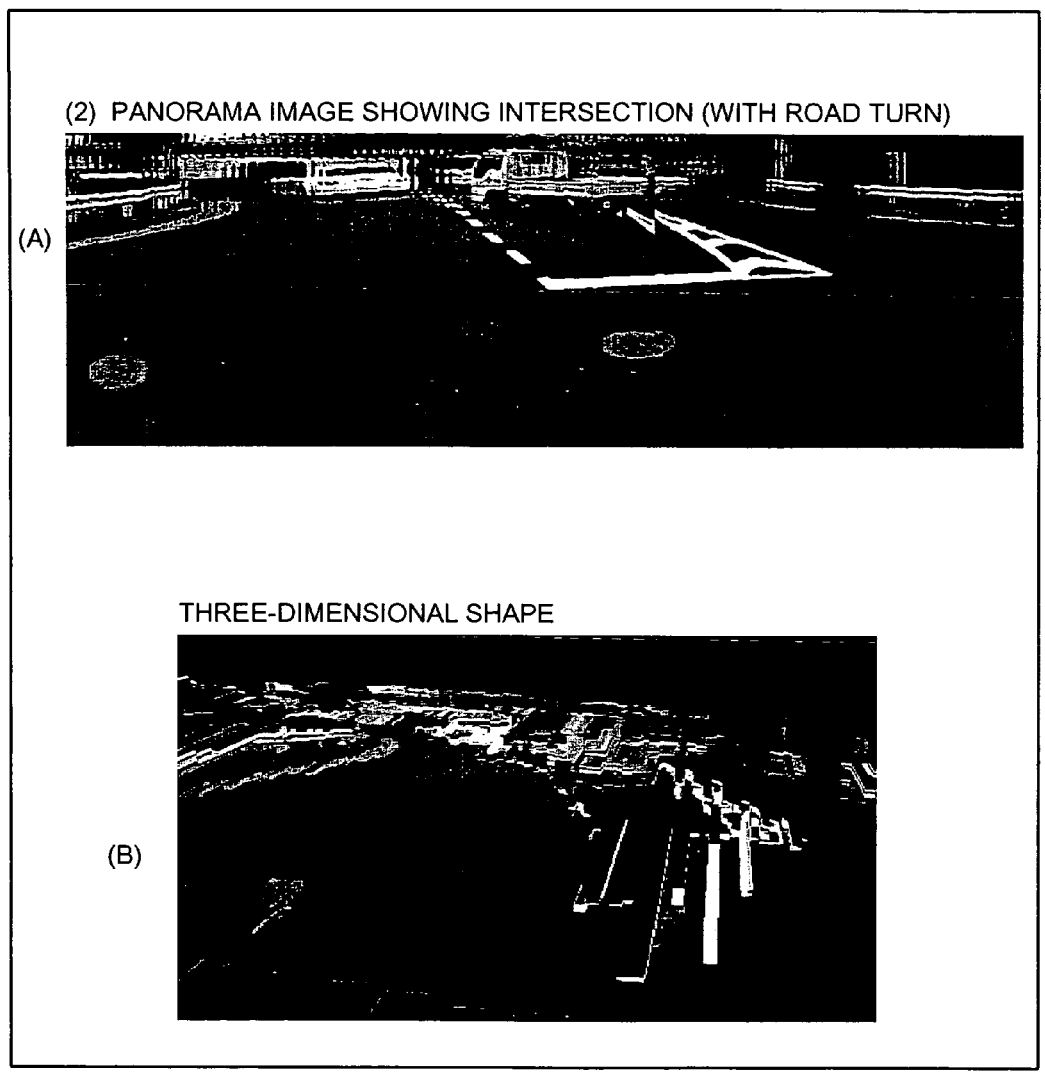
FIG. 17 is still another schematic for explaining data of three-dimensional shape.
Figure 18:
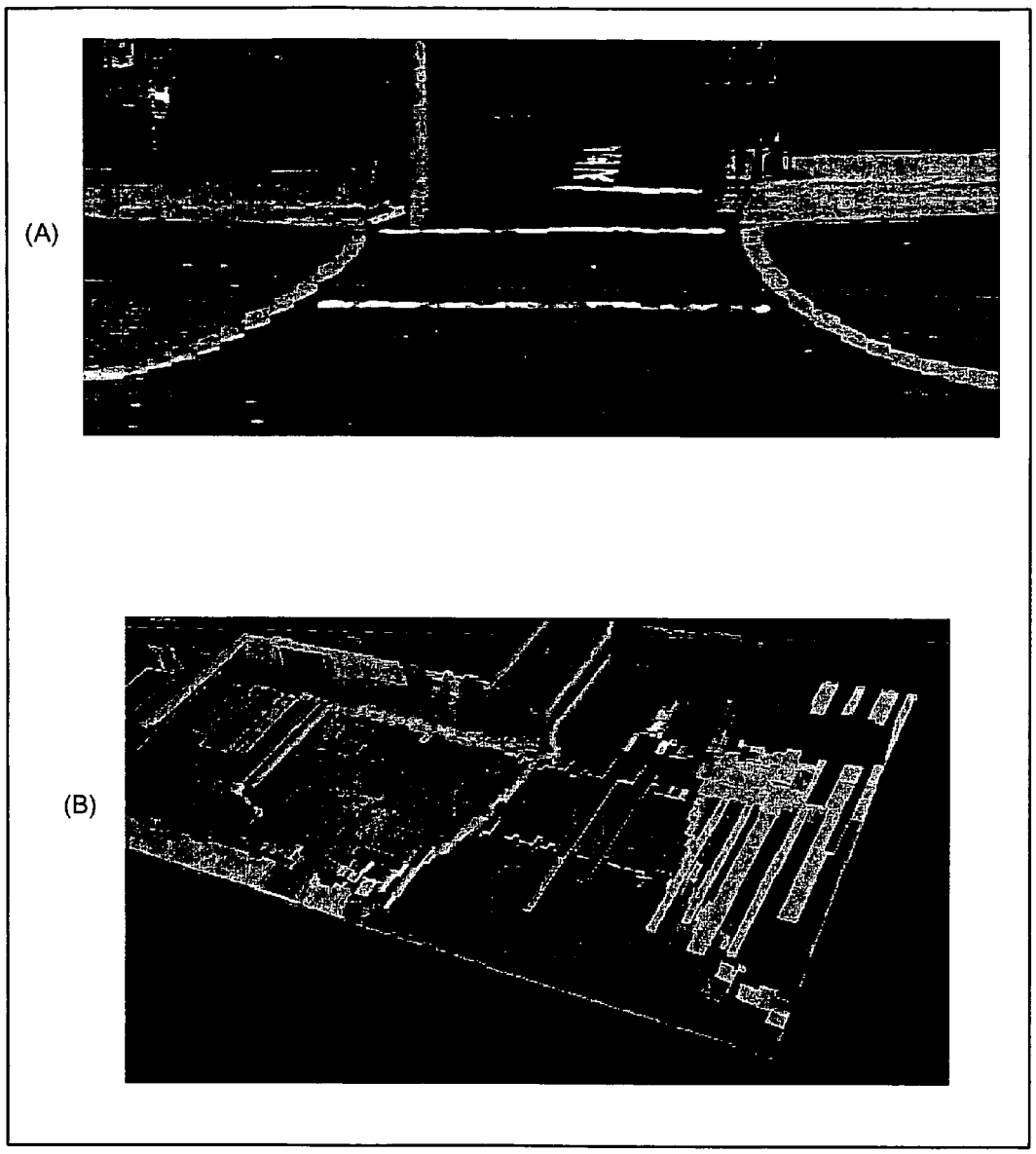
FIG. 18 is a still another schematic for explaining data of three-dimensional shape.

FIGS. 16 to 18 are schematics of other examples of three-dimensional shape data. Diagrams (A) in FIGS. 16 to 18 illustrate panorama images that are textures for the three-dimensional shape data, and diagrams (B) in FIGS. 16 to 18 illustrate the three-dimensional shape data with the texture-mapped panorama images.

Three-dimensional shape data may be created without a texture, or may be created with other texture-mapped images than the panorama image G according to an application, other images including a special panorama image having monochrome light and shade according to optical flow values or a specific color (e.g. red) corresponding to a given or higher optical flow value.

Three-dimensional shape data may be displayed in separation from the panorama image G, and a map may be displayed with or in separation from the three-dimensional shape data. The image analyzing apparatus according to the third embodiment can be used as a system that has no result display unit 902, and that is dedicated for creating of three-dimensional shape data. The image analyzing apparatus of the third embodiment allows a user to quickly detect a parking vehicle, store, etc. that are subjects projecting this side on the three-dimensional shape data, and turns the panorama image into one that is similar to the on-site scene to save trouble in analysis work.

A fourth embodiment the present invention is an example of displaying a map dynamically at the result display unit 902 shown in FIGS. 1 to 3. The same composition as the composition described in the above embodiments including the first to the third embodiments is given the same reference character, and is not explained further.

Figure 19:
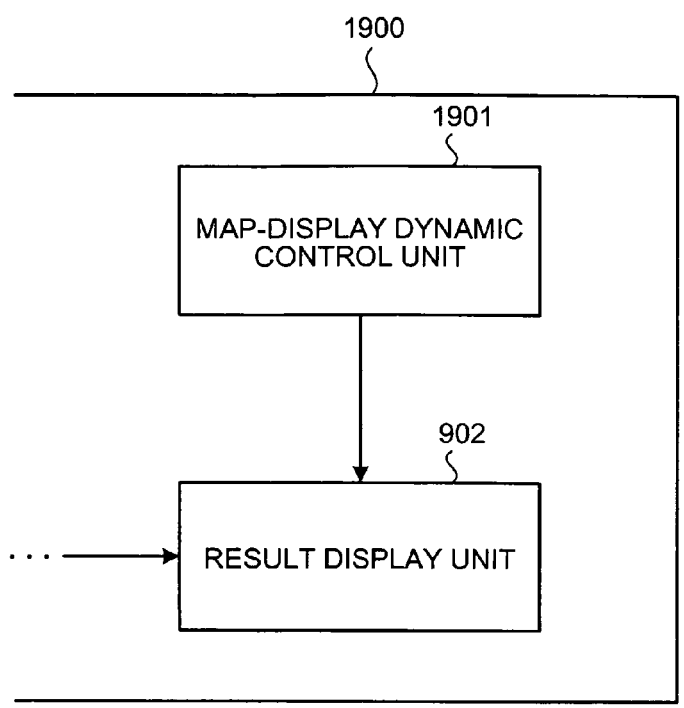
FIG. 19 is a block diagram of a functional configuration of an image analyzing apparatus according to a fourth embodiment of the present invention.

FIG. 19 is a block diagram of an image analyzing apparatus 1900 according to the fourth embodiment. The image analyzing apparatus 1900 includes respective functional components shown in FIGS. 2, 9, 12, 14 (not illustrated in FIG. 19) including the result display unit 902, and a map-display dynamic control unit 1901.

The map-display dynamic control unit 1901 controls map display dynamically to bring the map display in line with the direction of a line of sight of a user on a panorama image G, the direction of a line of sight of the user being estimated from obtained route and position data corresponding to the panorama image G, when the route and position data has been obtained by various methods involving information from a GPS, vehicle speed, distance patterns, given route, etc.

For example, when the route and position of a mobile object is given, the direction of perusing the panorama image G created from a roadside picture seen at the side of the mobile object is estimated automatically to be perpendicular to the route. The map-display dynamic control unit 1901, therefore, executes control for rotating the map dynamically so as to keep the estimated direction of perusing appeared as the same direction on the map constantly.

Figure 20:
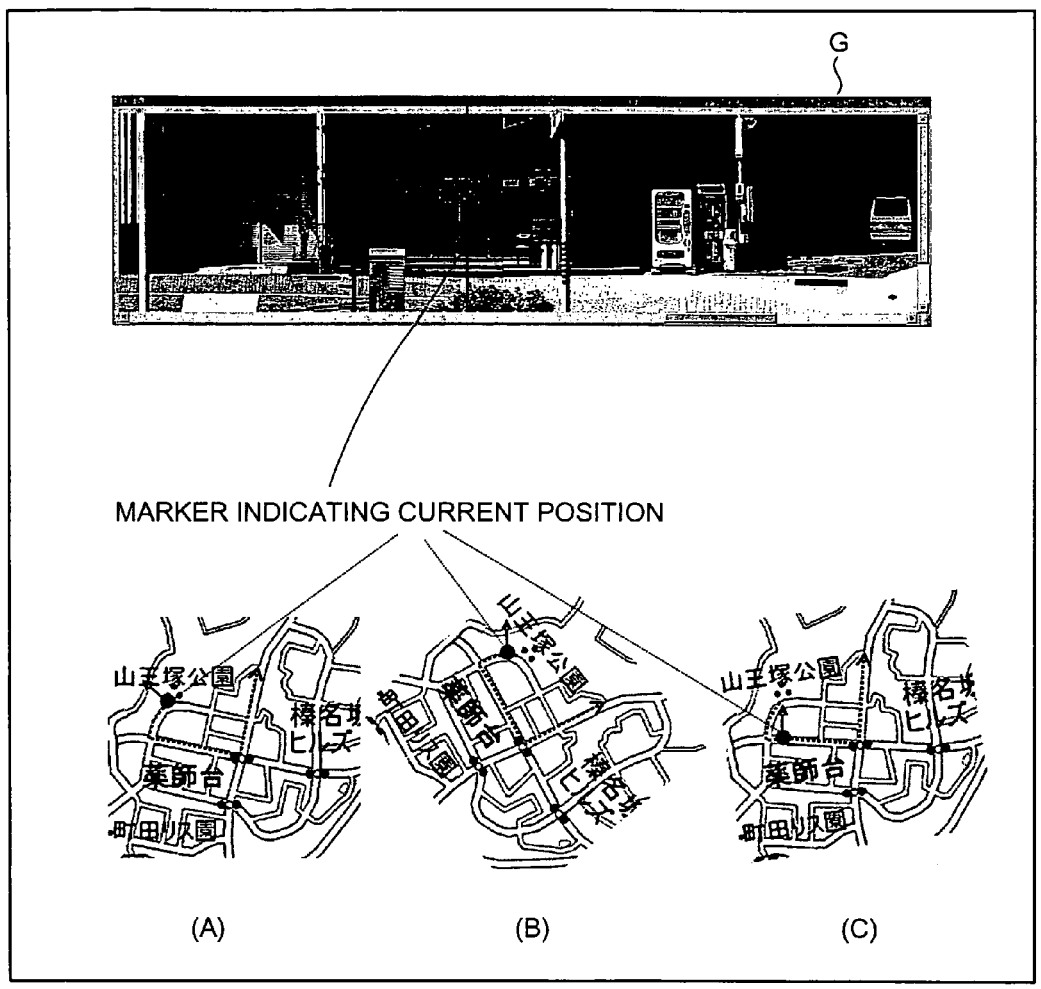
FIG. 20 is a schematic for illustrating dynamic control of map display according to the fourth embodiment.

FIG. 20 is a schematic for illustrating dynamic control of map display, where an example of rotation of the map corresponding to the panorama image G is exhibited. A device according to a conventional technique displays the map in the manner as shown in diagram (A) in FIG. 20, while the map-display dynamic control unit 1901 automatically controls the direction of the camera in line with scrolling of the current perusal position for the panorama image G to bring the camera direction constantly in the upper direction of the map, as shown in diagrams (B) and (C) in FIG. 20. The camera direction is controlled to be in the upper direction in the fourth embodiment, but the camera direction may be controlled to be in any of the upper, lower, left, and right direction.

While characters in the map are rotated together with the map according to the fourth embodiment, the characters may be controlled to be prevented from rotating while the map is rotated. Such control as described above allows a user to read from the map which direction the user is seeing through the panorama image G and/or what a subject is even if the route is meandering.

A fifth embodiment of the present invention is an example of creating two flow maps M, which are obtained by the associating unit 204, using roadside pictures obtained by shooting from the same route at different times, and comparing the flow maps M with each other. The same composition as the composition described in the above embodiments including the first embodiment is given the same reference character, and is not explained further.

Figure 21:
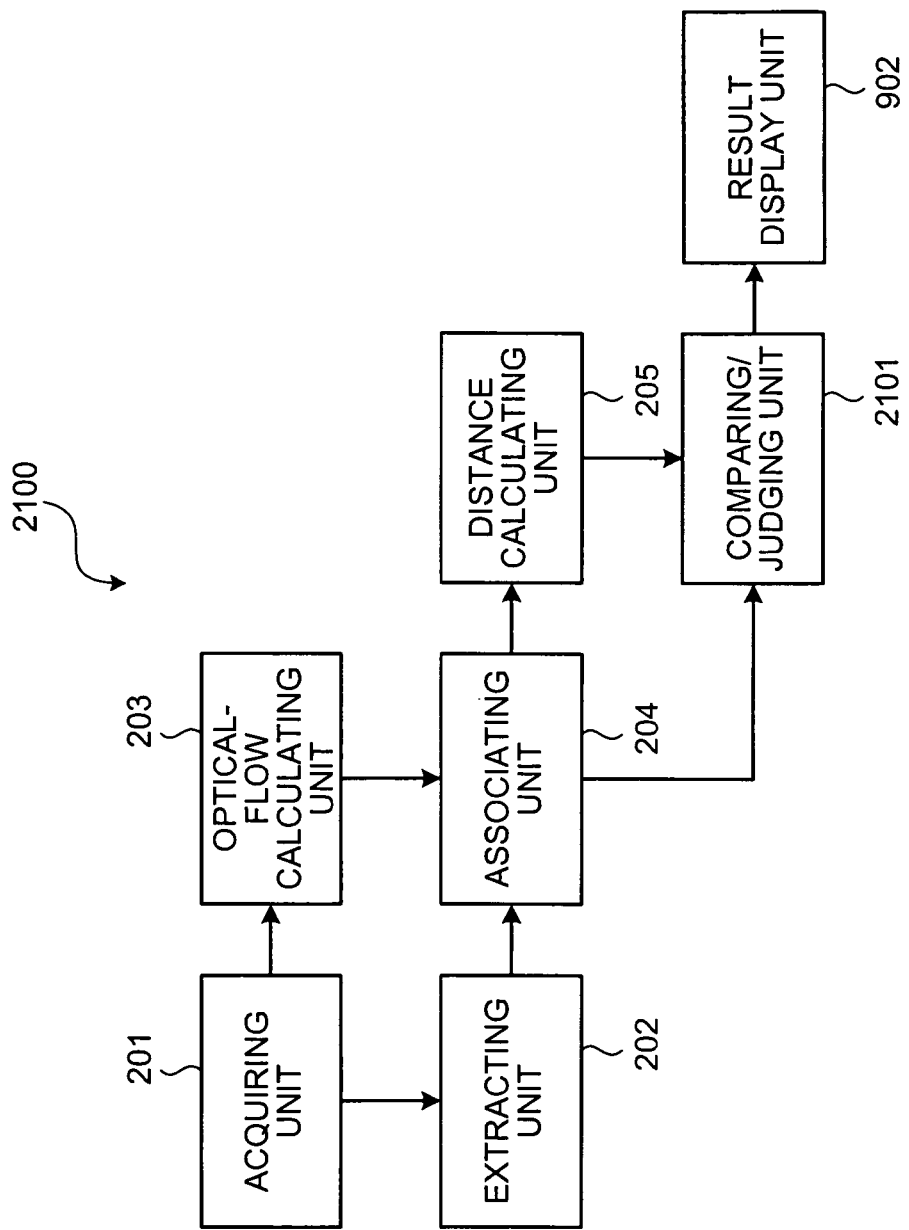
FIG. 21 is a block diagram of a functional configuration of an image analyzing apparatus according to a fifth embodiment of the present invention.

FIG. 21 is a block diagram of an image analyzing apparatus 2100 according to the fifth embodiment. The image analyzing apparatus 2100 includes a comparing/judging unit 2101 instead of the distance pattern judging unit 901 shown in FIG. 9.

The associating unit 204 makes respective flow maps using roadside pictures obtained by shooting from the same route at different times, and the comparing/judging unit 2101 compares one flow map with the other flow map. For example, the comparing/judging unit 2101 examines the area of a part showing a great difference between both flow maps, and detects a change when the value of the area is a threshold or larger.

A spot to be compared between both flow maps can be determined when position information and detailed route information on a part of each panorama image that is indicated by both flow maps is given. Comparison/judgment is possible to a certain extent without detailed route information as to two panorama images that have the same start point and endpoint and that cover roughly the same route. For example, positional alignment of slits constituting two panorama images can be carried out using a dynamic program (DP) matching method frequently employed for voice recognition.

In checking similarity between slits, for example, a histogram for the amount of characteristics in each slit (e.g. color, flow map, distance, etc.) is drawn up, and the similarity is calculated by a histogram intersection method. In such a manner, the corresponding relation between the slits of two panorama images can be derived, and the similarity of the derived corresponding slits is assessed using, for example, a preset threshold to detect a slit where a change has occurred.

Such comparison/judgment as described above allows estimation of a point on a roadside where a large change, such as a change from a building to a vacant lot or vice versa, may have occurred. The amount of characteristics used for the comparison/judgment may be the optical flow values from the flow maps or distances calculated from the optical flow values. Using also pixel information, such as information of the color of the part of the panorama images that corresponds to an estimated spot of change in the flow maps, for the comparison process allows further closing in on the estimated spot of change.

The result display unit 902 displays a judgment given by a comparing/judging unit 2102. For example, the result display unit 902 displays the spot corresponding to an estimated spot of change on a panorama image or on a map, or extract the spot from the panorama image and displays the extracted spot for separate perusal, or simply makes a list of estimated points of change.

Comparison and estimation in advance for a part where a possibility of change is high, using flow maps, enables a substantial reduction in trouble in the detection of a changed part on a roadside that has been carried out conventionally by visually comparing a plurality of panorama images. The fifth embodiment may include the distance pattern judging unit 901 shown in FIG. 1 in addition.

Approximate route and position data can be estimated by detecting a changeless ground object, such as an intersection, in each flow map and associating one changeless ground object in one flow map in correspondence with the other one in the other flow map. This enables identification of a part to be compared between the flow maps. Detection and mutual association of changeless ground objects enables more specific estimation, such as estimation of a change in a vacant lot only, or estimation of a constantly changing part other than a temporary view-blocking object, such as a vehicle on the shoulder on a road.

A sixth embodiment of the present invention is an example of calculating optical flows and subject distances before creating a panorama image G, judging a part on whether or not it is a part to be given a clear image in priority using a relative distance condition, and then creating the panorama image G. The same composition as the composition described in the above embodiments including the first embodiment is given the same reference character, and is not explained further.

Figure 22:
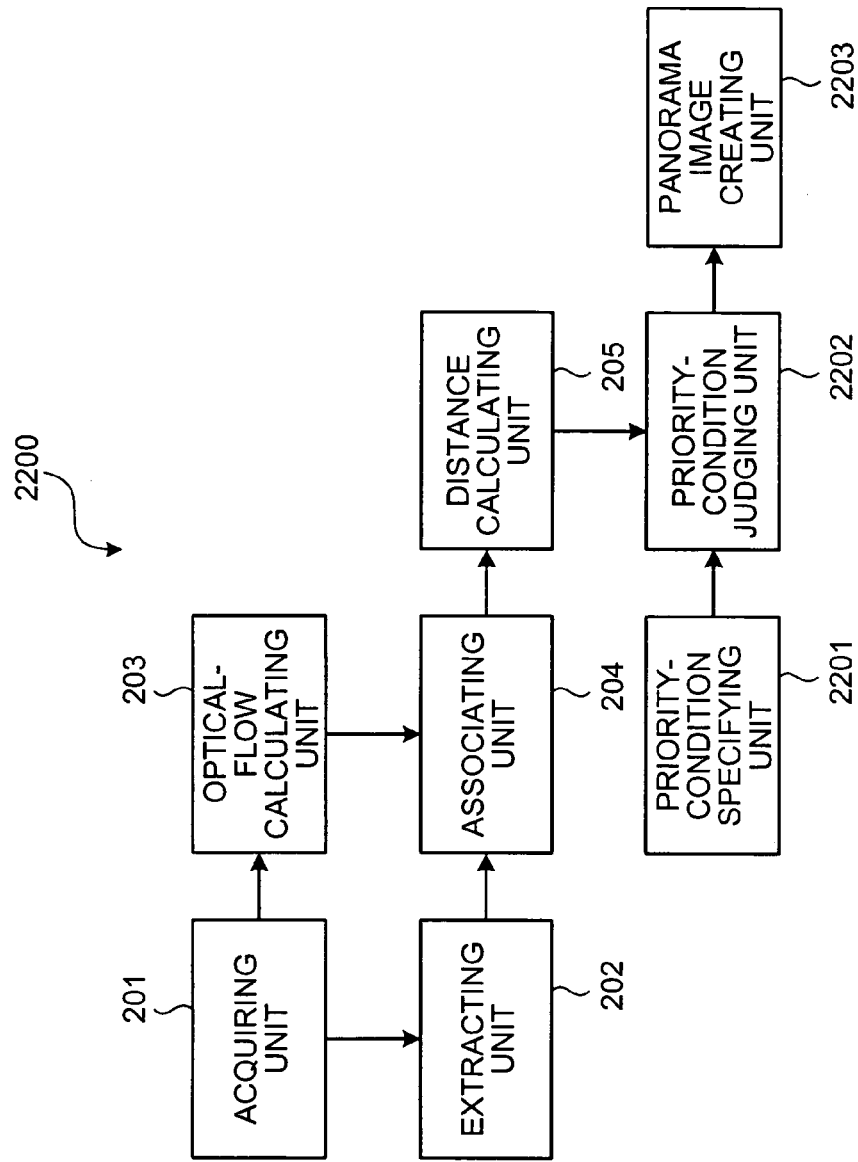
FIG. 22 is a block diagram of a functional configuration of an image analyzing apparatus according to a sixth embodiment of the present invention.

FIG. 22 is a block diagram of an image analyzing apparatus 2200 according to the sixth embodiment. The image analyzing apparatus 2200 includes the acquiring unit 201, the extracting unit 202, the optical-flow calculating unit 203, the associating unit 204, and the distance calculating unit 205, which are shown in FIG. 2. The image analyzing apparatus 2200 also includes a priority-condition specifying unit 2201, a priority-condition judging unit 2202, and a panorama image creating unit 2203.

When the panorama image G is created using the line sensor camera 402, a group of slits produced by multiple times of shots by the line sensor camera 402 in the shooting interval of a video camera are connected together to be provided as a partial panorama image (a part of the panorama image G), as described in other embodiments.

The priority-condition specifying unit 2201 specifies a condition of a subject to be given a clear image in priority, using a distance from the subject to the camera 114. For example, when a store at a roadside is a desired object of analysis, the store is the subject more important than a parking vehicle at the shoulder of a road or a guard rail when the store peeps itself across the vehicle or guard rail.

In such a case, for example, condition data requiring a distance of 5 m or longer from the camera 114 is preset, and a subject distant from the camera 114 by less than 5 m is considered to be less important. This distance condition can be changed whenever necessary, and may be changed in adjustment, for example, during perusal of the panorama image G.

The priority-condition judging unit 2202 compares a calculated group of subject distances to a priority distance (distance condition) specified by the priority-condition specifying unit 2201, and judges on which part in a picture frame becomes a priority part. Specifically, when a distance to a subject matches the distance condition, pixels or pixel groups in the search windows W, wk for optical flows providing the distance is considered to be the priority part.

The panorama image creating unit 2203 cuts out a partial panorama image $G_t$ including the specified priority part, and makes the panorama image G. Specifically, when the priority part is on the vertical centerline L of a picture frame $F_t$, the panorama image creating unit 2203 cuts out the partial panorama image $G_t$ from the vicinity of the vertical centerline L of the picture frame $F_t$ at a width defined by the optical flows of the priority part.

A conventional technique only allows cutting out in priority of a subject that is closest to the camera and that occupies a large area in the center of the picture plane, that is, the subject given the clearest image in the picture frame $F_t$. According to a conventional method, for example, when an enlarged image of a parking vehicle appears abruptly in the center of the picture plane, the basic flow for creating the partial panorama image $G_t$ is fixed to the parking vehicle, which causes a store to be examined at the back of the vehicle to become a repeated pattern or to expand laterally to offer an image difficult to see.

In contrast, according to the sixth embodiment, a subject of which distance to the camera 114 matches the priority condition can be cut out from the picture frame $F_t$, irrespective of how the subject is imaged on the picture frame $F_t$. Specifically, because of judgment on whether or not to give priority to a subject according to the distance of the subject to the camera 114, the partial panorama image $G_t$ can be created automatically so as to give a store (subject) a constant clearest image through the entire panorama image G when a distance change between the store and the camera is small as in a case of a roadside picture.

Figure 23:
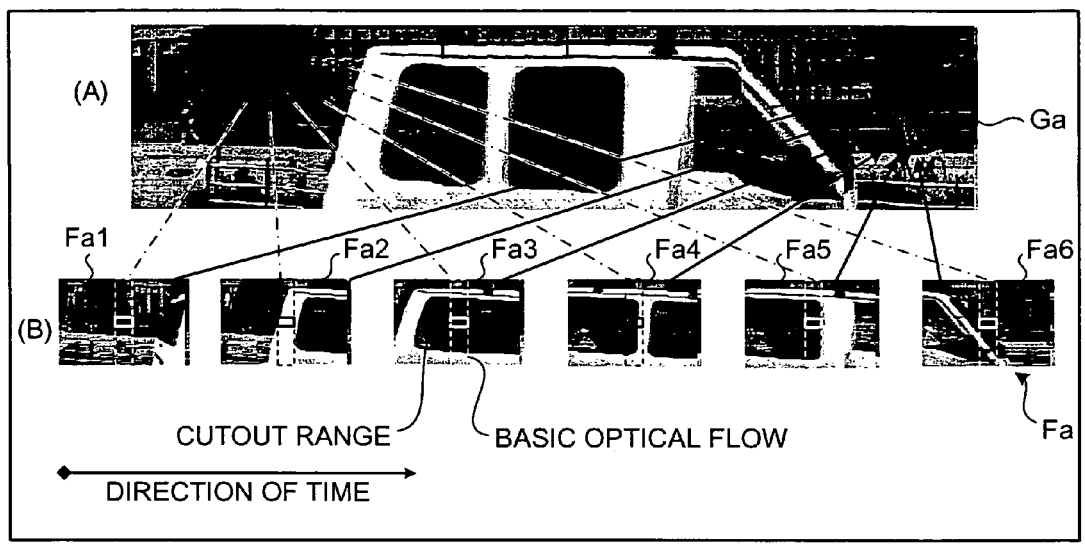
FIG. 23 is a schematic of a conventional panorama image.

In the following description, a conventional technique and the method according to the sixth embodiment are compared using a panorama image. FIG. 23 is a schematic of a conventional panorama image. Diagram A in FIG. 23 illustrates the panorama image Ga, and diagram B in FIG. 23 illustrates a group of picture frames Fa (Fa1 to Fa6) used to make the panorama image Ga. The picture frames of diagram B in FIG. 23 are arranged in the order of time passage from the left to right, where every picture frame of diagram B in FIG. 23 bears an image of two large poles of a background building across a parking vehicle.

In the panorama image G, the poles are found to appear at the front/rear of the parking vehicle in a flatly extended form (indicated by a single-dot chain line arrow in FIGS. 23), which presents repeated patterns between the front/rear of the parking vehicle. This is because the basic flow, on which cutting out and pasting of a partial panorama image is based, are set on the parking vehicle due to its large occupying area on the picture plane, which results in the flat extension of the building at the back of the vehicle.

Figure 24:
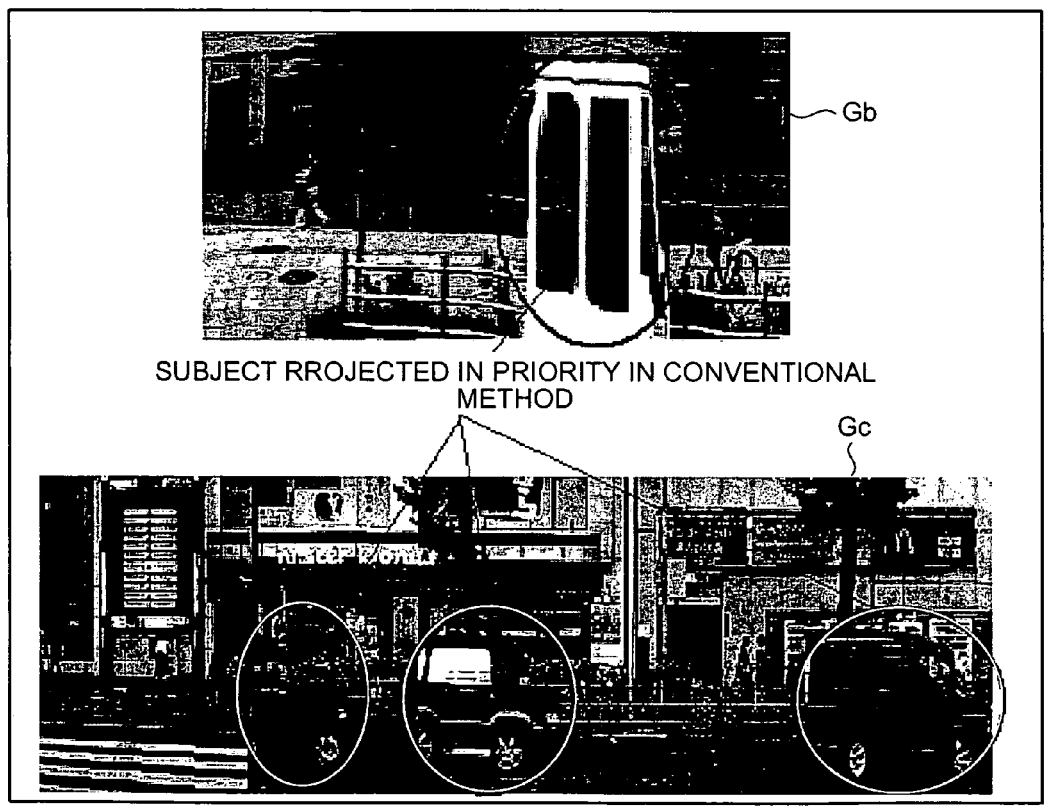
FIG. 24 is a schematic for explaining a panorama image according to a sixth embodiment.

FIG. 24 is a schematic of panorama images provided according to the sixth embodiment. Specifying one distance (e.g. 5 meters) to the vicinity of the store on the road as a priority distance allows dynamic searching for a point automatically matching the priority distance in every picture frame, thus enables creation of panorama images Gb, Gc based on such a point.

The parking vehicle on this side to the camera, therefore, is not selected as the basic area of optical flows even if the vehicle occupies a large area in the center of the picture plane, which allows creation of the panorama images Gb, Gc where the store and the background building are given clearest image constantly. The image analyzing apparatus according to the sixth embodiment may include, for example, the three-dimensional shape data creating unit 1401 in addition to the above functional components, to make a special panorama image having parts classified in distance-based color.

As described above, automatic searching for a subject that matches the distance condition, which is the depth information particularly important in roadside analysis, can be carried out by estimating the distance between each subject and the camera 114 in a partial panorama image before creating the partial panorama image. This enables creation of a panorama image where the fineness of an image of the subject is the first priority. Estimation of the distance between each subject and the camera 114 also provides data of distance patterns, which may be stored for use in applications as described in the other embodiments that contribute to saving trouble in perusing a panorama image.

A seventh embodiment according to the present invention is an example of re-synthesizing a panorama image where a subject at a given distance to the camera is given priority for separate perusal, using an already created panorama image G and its optical flows and the distance patterns. The same composition as the composition described in the above embodiments including the first embodiment is given the same reference character, and is not explained further.

Figure 25:
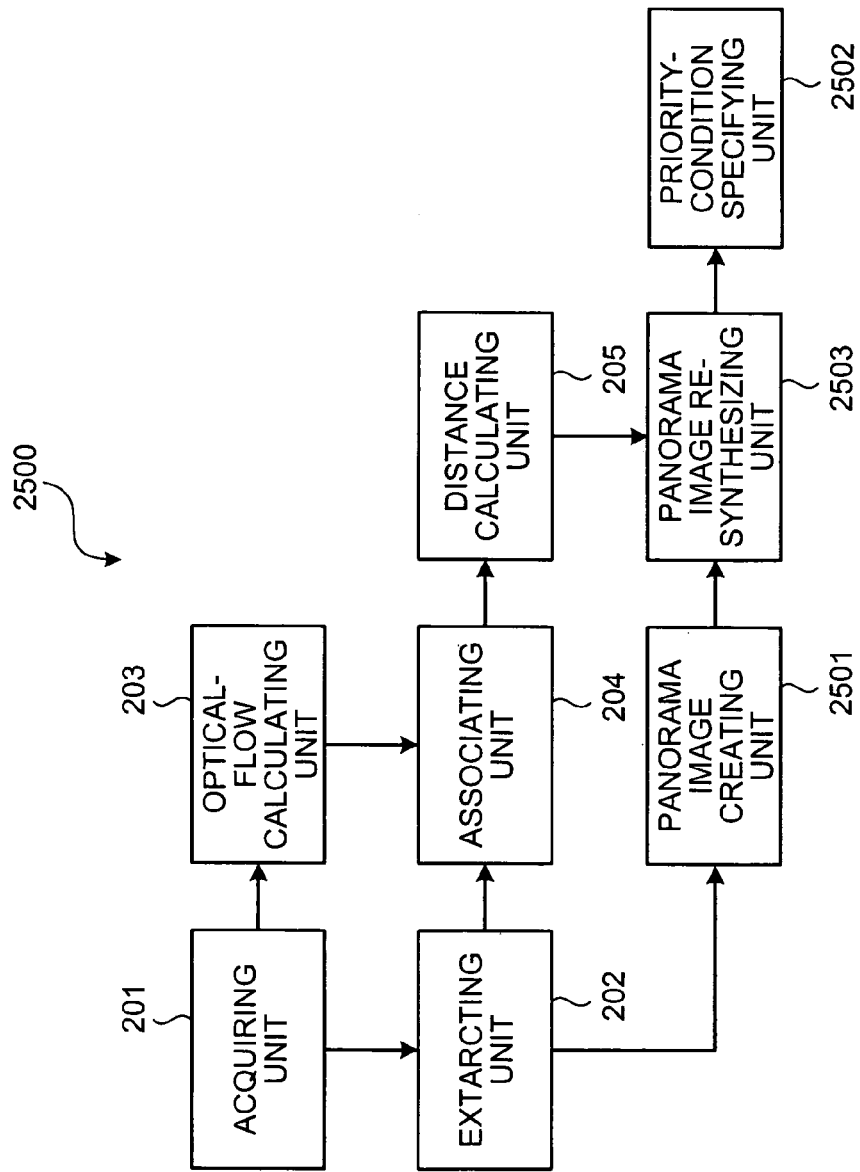
FIG. 25 is a block diagram of a functional configuration of an image analyzing apparatus according to a seventh embodiment of the present invention.

FIG. 25 is a block diagram of an image analyzing apparatus 2500 according to the seventh embodiment. The image analyzing apparatus 2500 includes the acquiring unit 201, the extracting unit 202, the optical-flow calculating unit 203, the associating unit 204, and the distance calculating unit 205, which are shown in FIG. 2. The image analyzing apparatus 2500 also includes a panorama image creating unit 2501, a priority-condition specifying unit 2502, and a panorama image re-synthesizing unit 2503.

The panorama image creating unit 2501 makes a panorama image G according to various methods. The panorama image G is created using the line sensor camera 402, or using the video camera 401 with a selection of the biggest optical flow as the basic flow among each flow on the centerline of a frame. The panorama image G may be created using the method of the sixth embodiment, according to which such a distance condition is specified that a subject having the minimum distance to the camera in a frame is given priority.

Such a panorama image G created by the panorama image creating unit 2501 presents some objects as flatly extended images or repeated patterns, as described referring to FIGS. 23 and FIG. 24. Subjects on the panorama image G are, therefore, either images clear as their actual appearances (e.g. the subject on this side in FIGS. 23) or images of flatly extended forms or of repeated patterns (e.g. the subject at the background).

In other words, each subject in the panorama image G is either a subject occupying a minimum required pixel area or a subject of redundant image occupying more pixel areas than necessary, which is presented in plurality or in a flatly extended form.

The associating unit 204 associates optical flow values with a partial panorama image to make a flow map M, and, at the same time, registers the location of a part in the panorama image G that constitutes one image as the unit of the partial panorama image $G_i$, which means the location of the junction between connected partial panorama images $G_i$, as flow map data.

The priority-condition specifying unit 2502 specifies a distance to the camera 114 according to a method of specifying a subject to be given the clearest image, as in the same manner according to the sixth embodiment. When the method of the sixth embodiment is applied at the panorama image creating unit 2501, the priority-condition specifying unit 2502 may specify a priority distance different from a distance condition (i.e. closest to the camera) specified in the sixth embodiment.

The panorama image re-synthesizing unit 2503 detects junctions in the panorama image G from the flow map M, executes processes of re-cutting out and reducing each partial panorama image $G_i$, and connects the cut out partial panorama image $G_i$ again to form a new panorama image G. Specifically, a pixel part whose distance to the camera matches the priority distance is searched in each partial panorama image $G_i$ from the flow map M and distances estimated from the flow map M.

When the pixel part constitutes repeated patterns, one of the repeated patterns is cut out from the original partial image $G_i$ with the vertical size kept as it is, and is provided as a new partial panorama image $G'_i$. When the pixel part constitutes a flatly extended image, the width of the partial image $G_i$ is reduced to a new width using Equation 11 shown below, and the reduced image is used as a new partial panorama image $G'_i$.

new width=C×(original width)×(optical flow value of pixel part/maximum optical flow value in partial panorama image) (11)

where C is a given constant.

Figure 26:
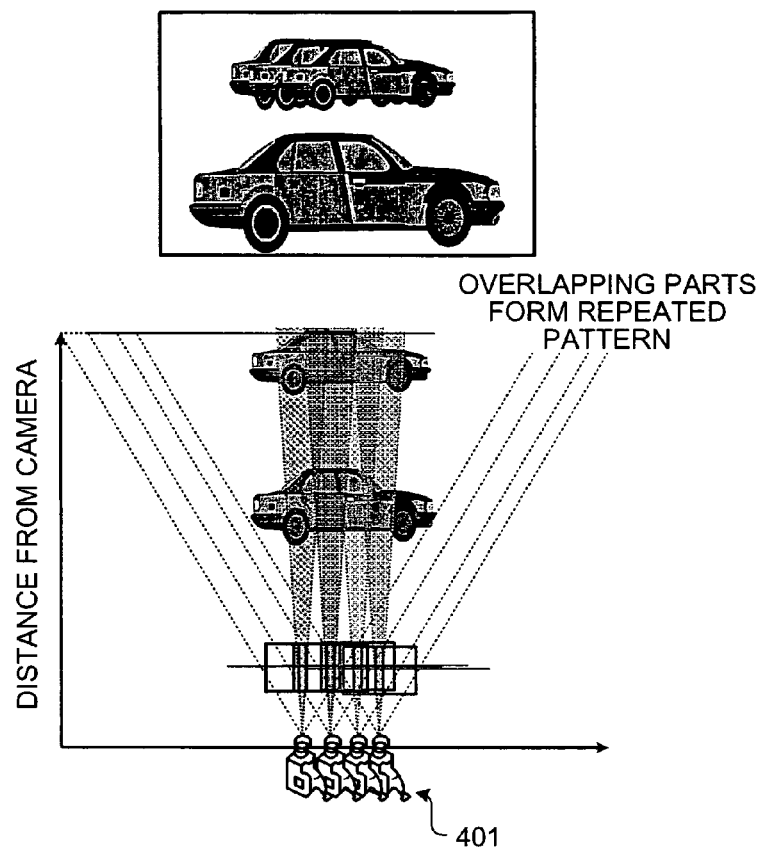
FIG. 26 is a schematic for explaining how a subject is projected according to the seventh embodiment.
Figure 27:
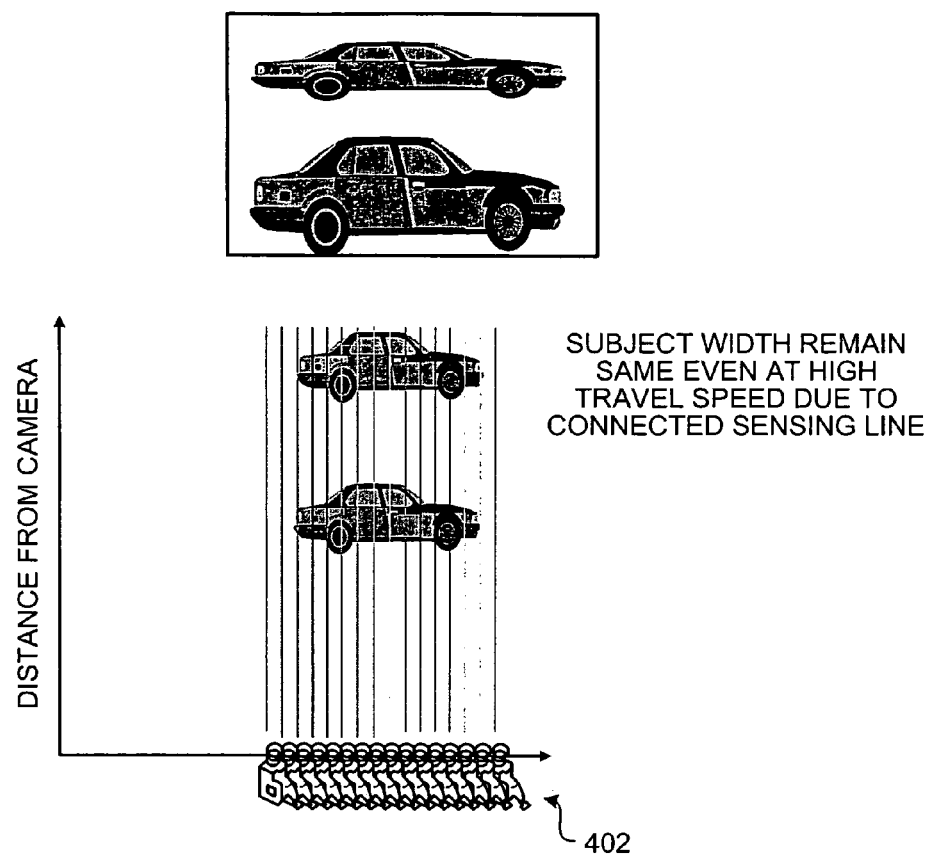
FIG. 27 is another schematic for explaining how a subject is projected according to the seventh embodiment.

Judgment on whether being repeated patterns or a flatly extended image is created based on the contents of a process executed by the panorama image creating unit 2501 in the following manner. FIGS. 26, 27 are explanatory views showing how a subject is projected on a panorama image. FIG. 26 exhibits a case where the video camera 401 is used, and FIG. 27 exhibits a case where the line sensor camera 402 is used.

As shown in FIG. 26, when a part other than the frame part (subject) serving as the reference for a cutout width for a partial panorama image is subjected to an extension process in a panorama image G created by using the video camera 401 and then the partial panorama image is created, the partial panorama image appears as a flatly extended image.

As shown in FIG. 27, a panorama image created by using the line sensor camera 402 is basically a laterally extended image as a whole because the panorama image is produced by parallel projection. As a result, the pixel part of a subject are projected on the image in a flatly extend form in correspondence with the length of the distance between the subject and the line sensor camera 402.

An example of repeated patterns is presented as the background building shown in FIG. 23A). Such repeated patterns are developed as the image angle of the camera 114 widens in proportional to a distance from the subject to the camera 114 in the course of projection to narrow the occupation width of the subject on the projection plane, i.e., the picture plane, while the subject as a real thing has the same unchangeable width. In the panorama image G created by using picture frames $F_i$ provided by the video camera 401, repeated patterns are developed when the partial panorama image $G_i$ is created without executing the extension process as described above.

As another method of judging on repeated patterns or a flatly extended image, repeated patterns may be extracted as a pattern of change in the amount of pixel characteristics, that is, change in brightness or color. A newly synthesized panorama image may be presented for perusal after the priority-condition specifying unit 2502 and the panorama image re-synthesizing unit 2503 have executed their processes on the panorama image G all together. In another application, however, the panorama image re-synthesizing unit 2503 may constantly make a newly synthesized panorama image for perusal in response to the priority-condition specifying unit 2502 that specifies a priority distance at all times.

Directly specifying a priority distance is not the only option. Instead, a subject on the panorama image G is specified by clicking a mouse to allow the image analyzing apparatus to calculate the distance and optical flows that correspond to the subject automatically and internally, and the calculated distance is used as a priority distance.

The image analyzing apparatus according to the seventh embodiment makes the panorama image G' where a desired subject is projected in a finest manner and offers the panorama image G' for perusal in a dynamic manner. Different from the device of other embodiments, which makes the panorama image G from a picture (a group of slits) obtained by the line sensor camera 402 or from the picture frame $F_i$ obtained by the video camera 401, the device of the seventh embodiment requires merely one panorama image G as the base to make the panorama image G', thus reduces the amount of data to use.

This allows a user to use and peruse panorama images flexibly. For example, the user makes one basic panorama image of a roadside first, and synthesizes a panorama image bearing a fine image of mountains from the basic panorama image when the user desires to see the distant mountains clearly, or synthesize a panorama image bearing a fine image of a parking vehicle when the desires to see the parking vehicle closer to the camera clearly.

As described above, according to the embodiments of the present invention (including first to seventh embodiments), effective use and perusal of a panorama image with less trouble is achieved by calculating optical flows, which are the amount of travel of pixels in an area in each image from a picture, creating a panorama image using various methods, and creating a flow map that associates each pixel position of the panorama image in correspondence with the optical flows.

In estimating the distance between a subject and a camera from optical flow values, a large optical flow value in the picture plane of the camera can be used as a value representing the relative speed between the panorama image and the external world. A distance map for a group of estimated subject distances with regard to the panorama image can be created based on the position of the optical flow values used for estimation in the flow map.

The distance between each subject on the panorama image and the camera is estimated from each optical value shown in the flow map for the panorama image to allow a comparison between distance patterns in the panorama image and registered distance patterns. This comparison allows detection of the relative position of ground objects to the camera or of the type of the ground objects, which include an intersection, vacant lot, building of a special shape, and a parking vehicle, thus contributes to saving trouble in perusing the panorama image.

When subjects projected at respective spots on the panorama image are identified beforehand, a group of distances from the camera to the subjects are estimated from the flow map and each optical flow value for the panorama image to be able to provide a distance pattern.

A detected ground object can be displayed in a highlighted manner on the panorama image. A detected part on the panorama image that is considered to bear a ground object can be selected in priority for perusal to provide a summary of the panorama image.

The position of detected ground objects in the panorama image can be utilized to make a ground object map for the panorama image. Each position and direction data of the camera used for creating the panorama image is put into the image analyzing apparatus in a form of measurements and fixed values provided by various methods using the GPS, vehicle speed sensor, etc., and is maintained as a position information map that associates a camera-related position in the panorama image in correspondence with the position and direction data. This position information map can be utilized in perusing the panorama image.

Each position and direction data of the camera used for creating the panorama image is put into the image analyzing apparatus in a form of measurements and fixed values provided by various methods using a GPS, vehicle speed sensor, etc. for estimation of a shooting space of the camera that faces in a certain direction at each camera position and its interpolated position. This allows estimation of a group of ground objects present in the shooting space and its periphery from an ordinary map, etc. to provide a ground object information map that associates camera-related positions in the panorama image in correspondence with the estimated ground objects. This ground object information map can be utilized in perusing the panorama image.

A plurality of panorama images, and flow maps and position information maps for camera position and perusal direction are used to estimate a part in each panorama image that is the same position aimed by the camera in creating each panorama image. The distance between a subject in that part and the camera is estimated for each panorama image using the flow map, and distance patterns obtained from respective panorama images are compared to judge on the size of a difference in the distance patterns. When a large difference in the distance patterns is found for the part, the part is judged to be a spot where a change in a roadside subject occurs. In this manner, saving trouble in perusing the panorama image is achieved.

In estimating such a part representing the same position aimed by the camera in creating each panorama image, the part can also be estimated by deriving the corresponding relation between slits constituting two panorama images, using the DP matching method.

In another method, while a large difference in distance patterns is judged on a part in each panorama image, a ground object on the part is estimated in comparison with registered ground object change and distribution patterns, and selective judgment on the occurrence of change is created according to the validity of the estimation and the type of the ground object identified by the estimation. Judging the part on whether it is the spot where a change in a roadside subject occurs in this manner also enables saving trouble in perusing the panorama image.

A part detected as a spot of roadside subject change can be displayed on the panorama image. Such a part detected as the spot of roadside subject change in the panorama image can be selected in priority for perusal as a summery of the panorama image.

Optical flow distribution patterns can be substituted for distance patterns. When subjects or some of them on the panorama image are specified, distances from the subjects to the camera can be calculated using the flow map corresponding to the subjects, which enables display of optical flows and subject distances.

When each position and direction data of the camera used for creating the panorama image is put into the image analyzing apparatus in a form of measurements and fixed values provided by various methods using a GPS, vehicle speed sensor, etc., and subjects or some of them on the panorama image are specified, distances from the subjects to the camera are calculated using the flow map corresponding to the subjects. This allows calculation of a position that is separated from the camera position by the calculated distance in a camera direction, and enables display of optical values and information on the calculated position, of a map related to the position, and of the location of the position on the map, etc.

A three-dimensional panorama shape corresponding to the panorama image can be created using depth information including each optical flow value on the optical flow map for the panorama image or a distance from each subject to the camera that is calculated from the optical flow value. The panorama image can be pasted as a texture on the created three-dimensional panorama shape to allow three-dimensional perusal of the panorama image.

A light and shade panorama image can be created by expressing light and shade with the size of each optical flow value on the flow map for the panorama image. When position information and the direction of the camera at each part of the panorama image are known, the map can be rotated in control in line with perusal of the panorama image so as to set the direction of the camera on the panorama image constantly the same on the map. The map can be so rotated in line with perusal of the panorama image as not to rotate characters on the map.

A condition for a subject to be given fine image in priority on the panorama image is specified using a distance from the subject to the camera. A large area optical flow and local optical flows of each picture frame for creating the panorama image are then calculated to estimate each subject distance. A pixel part where a subject distance matches a priority condition is searched dynamically in each picture frame, and such pixel part is used as a reference for identifying a part to be cut out from the panorama image and for pasting the cutout image. This allows creation of the panorama image where a subject matching the specified distance condition (priority condition) is given finest image in priority.

As the flow map for the panorama image created, the location of junctures between cutout images is recorded in the image analyzing apparatus. When the panorama image is perused, a search condition for a subject to be given a fine image in priority on the panorama image is specified with parameters of a distance to the camera and optical flow values, using an instruction or figures on the subject on the panorama image. A priority part corresponding to the subject is searched in the panorama image, using a distance to the camera estimated from the flow map or optical flow values on the flow map. The subject is then judged on whether it is projected as repeated patterns or a flatly extended image in a cutout image to which the priority part belongs.

When the subject is presented as repeated patterns, the width and position of the cutout image is adjusted so as to cut out only one cycle of the repeated patterns, and then a new cutout image is cut out. When the subject is presented as a flatly extended image, the ratio of the maximum optical flow value or the minimum distance value in the cutout image containing the subject to the optical flow value of the priority part or to the reciprocal of the optical flow value of the priority part are calculated. The width of the cutout image is reduced at the calculated ratio to provide a new cutout image. New cutout images are thus connected again to synthesize another panorama image.

As described above, large area optical flows and local optical flows, a relative distance to the camera estimated from the large/local optical flows, position information input provided by various methods, and position data corrected by optical flows, etc. are obtained for each subject and part of the panorama image. While such a panorama image is a long and massive image that has been simply perused conventionally, those obtained information and data can be utilized as each piece of information on the panorama image (subject distance, flow map, etc.).

The information utilized as such enables estimation of the identity of a subject appearing on the panorama image, detection of different spots on a plurality of panorama images, and creating of a three-dimensional shape data corresponding to the panorama image. This saves trouble in analyzing a roadside.

Specifically, automatic estimation of an area to be analyzed in the panorama image or processing of such an area into a more observable form becomes possible to reduce trouble in perusing the panorama image substantially. In addition, such a panorama image that gives a subject at a specified distance the finest image can be produced or synthesized again dynamically from a picture or an existing panorama image.

This leads to a reduction in costs and necessary data for creating the panorama image. Besides, since the fineness of the image of a desired subject in the panorama image is controlled when necessary, the panorama image can be used as a method of data compression and summary that is sufficiently effective as a substitute for a picture. Aside from panorama image analysis, the flow map provided according to the embodiments can be utilized as a correction unit for position information given by the GPS, vehicle speed sensor, etc.

As described above, the image analyzing apparatus according to the present invention reduces labor in roadside analysis, thereby reducing a load on a worker in checking a panorama image, and making a map maintenance work efficient.

The image analyzing method described in the embodiments of the present invention is carried out by causing a computer, such as a personal computer, workstation, etc. to execute a prepared program. The program is recorded in a computer-readable recording medium, such as a HD, an FD, a CD-ROM, an MO, a DVD, etc., and the computer reads the program out of the recording medium to execute the program. The program may be a transmittable medium that can be distributed via a network such as the Internet.

According to the embodiments described above, it is possible to reduce a load on a worker engaged in roadside analysis, and to conduct a map maintenance work efficiently.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable, non-transitory medium that stores therein a computer program for analyzing a panorama image that is created by processing a series of picture frames, the computer program making a computer execute:
   extracting a partial image to constitute a part of the panorama image, from one picture frame among the picture frames;
   calculating optical flows of the one picture frame from the one picture frame and an adjacent picture frame;
   associating each of the optical flows with each pixel in the partial image;
   calculating a distance from a camera to a subject appearing in the partial image based on the associated optical flows;
   identifying the subject based on a distance pattern corresponding to the calculated distance;
   inputting a route of a mobile object on which a camera to obtain the series of the picture frames is mounted; and
   correcting the input route based on a result of identification at the identifying.

2. The computer-readable, non-transitory medium according to claim 1, wherein the computer program further makes the computer execute creating three-dimensional shape data of the subject based on the panorama image and the optical flows.

3. A computer-readable, non-transitory medium that stores therein a computer program for analyzing a panorama image that is created by processing a series of picture frames, the computer program making a computer execute:
   extracting a partial image to constitute a part of the panorama image, from one picture frame among the picture frames;
   calculating optical flows of the one picture frame from the one picture frame and an adjacent picture frame;
   associating each of the optical flows with each pixel in the partial image; and
   calculating a distance from a camera to a subject appearing in the partial image based on the associated optical flows;
   comparing the optical flows with optical flows of a second panorama image that has been obtained by taking a series of picture frames on a same route in a same direction as those of the panorama image; and
   displaying information on a change between the panorama image and the second panorama image based on a result of comparison at the comparing.

4. The computer-readable, non-transitory medium according to claim 3, wherein a dynamic programming matching method is used at the comparing.

5. A computer-readable, non-transitory medium that stores therein a computer program for analyzing a panorama image that is created by processing a series of picture frames, the computer program making a computer execute:
   extracting a partial image to constitute a part of the panorama image, from one picture frame among the picture frames;

calculating optical flows of the one picture frame from the one picture frame and an adjacent picture frame;

associating each of the optical flows with each pixel in the partial image; and calculating a distance from a camera to a subject appearing in the partial image based on the associated optical flows, wherein the distance is calculated by the following equation:

$$\text{distance} = a \cdot W/M,$$

where a is a constant, W is a travel distance of the camera or a large area optical flow, and M is an optical flow value.

6. An apparatus for analyzing a panorama image that is created by processing a series of picture frames, the apparatus comprising:

an extracting unit configured to extract a partial image to constitute a part of the panorama image, from one picture frame among the picture frames;

an optical-flow calculating unit configured to calculate optical flows of the one picture frame from the one picture frame and an adjacent picture frame;

an associating unit configured to associate each of the optical flows with each pixel in the partial image; and a distance calculating unit configured to calculate a distance from a camera to a subject appearing in the partial image based on the associated optical flows, wherein the distance is calculated by the following equation:

$$\text{distance} = a \cdot W/M,$$

where a is a constant, W is a travel distance of the camera or a large area optical flow, and M is an optical flow value.

7. A method of analyzing a panorama image that is created by processing a series of picture frames, the method comprising:

extracting a partial image to constitute a part of the panorama image, from one picture frame among the picture frames;

calculating optical flows of the one picture frame from the one picture frame and an adjacent picture frame;

associating each of the optical flows with each pixel in the partial image; and calculating a distance from a camera to a subject appearing in the partial image based on the associated optical flows, wherein the distance is calculated by the following equation:

$$\text{distance} = a \cdot W/M,$$

where a is a constant, W is a travel distance of the camera or a large area optical flow, and M is an optical flow value.

8. The computer-readable, non-transitory medium according to claim 3, wherein the computer program further makes the computer execute creating three-dimensional shape data of the subject based on the panorama image and the optical flows.

9. The computer-readable, non-transitory medium according to claim 5, wherein the computer program further makes the computer execute creating three-dimensional shape data of the subject based on the panorama image and the optical flows.

10. The apparatus according to claim 6 further comprising a creating unit that creates three-dimensional shape data of the subject based on the panorama image and the optical flows.

11. The method according to claim 7 further comprising creating three-dimensional shape data of the subject based on the panorama image and the optical flows.

\* \* \* \* \*